(12) United States Patent
Wang et al.

(10) Patent No.: US 10,846,936 B2
(45) Date of Patent: Nov. 24, 2020

(54) IMAGE DISPLAY METHOD AND DEVICE

(71) Applicant: Tencent Technology (Shenzhen) Company Limited, Shenzhen (CN)

(72) Inventors: Xiang Wang, Shenzhen (CN); Tiancheng Liu, Shenzhen (CN); Pengyun Jiang, Shenzhen (CN); Binru Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/560,753

(22) Filed: Sep. 4, 2019

(65) Prior Publication Data

US 2019/0392648 A1    Dec. 26, 2019

Related U.S. Application Data

(63) Continuation of application No. PCT/CN2018/091950, filed on Jun. 20, 2018.

(51) Int. Cl.
*G06T 19/00* (2011.01)
*G06F 3/0346* (2013.01)
(Continued)

(52) U.S. Cl.
CPC .......... *G06T 19/006* (2013.01); *G06F 3/0346* (2013.01); *G06T 3/20* (2013.01); *G06T 3/60* (2013.01); *G06T 2200/24* (2013.01)

(58) Field of Classification Search
CPC .......... G06T 19/006; G06T 3/20; G06T 3/60; G06T 2200/24; G06F 3/0346
See application file for complete search history.

(56) References Cited

U.S. PATENT DOCUMENTS

2016/0282619 A1* 9/2016 Oto .................. A63F 13/25
2018/0165853 A1* 6/2018 Inagi ................ G09G 5/30

FOREIGN PATENT DOCUMENTS

CN          103116451 A       5/2013
CN          105917268 A       8/2016
(Continued)

OTHER PUBLICATIONS

Tencent Technology, ISR, PCT/CN2018/091950, dated Sep. 5, 2018, 2 pgs.
(Continued)

*Primary Examiner* — Peter D McLoone
(74) *Attorney, Agent, or Firm* — Morgan, Lewis & Bockius LLP

(57) ABSTRACT

Embodiments of this application provide an image display method performed at a terminal device. The method includes: capturing, by the terminal device, a first image; obtaining, by the terminal device, information about a first posture, the first posture being a posture of the terminal device when the terminal device captures the first image; determining, by the terminal device, a first movement track for a virtual object to move from a first position to a second position in a virtual world according to the information about the first posture; and presenting, by the terminal device, the first image as a background image of the virtual world, and dynamically rendering the virtual object to move along the first movement track in the first image, so that the virtual object moves vertically to the horizontal plane in the real world regardless of the first posture of the terminal device. Therefore, fidelity of the AR technology is improved, and user experience is improved.

20 Claims, 10 Drawing Sheets

(51) Int. Cl.
    *G06T 3/20*     (2006.01)
    *G06T 3/60*     (2006.01)

(56) References Cited

FOREIGN PATENT DOCUMENTS

| CN | 106097258 A | 11/2016 |
|---|---|---|
| CN | 106255943 A | 12/2016 |
| CN | 107291266 A | 10/2017 |
| KR | 20140001167 A | 1/2014 |

OTHER PUBLICATIONS

Tencent Technology, WO, PCT/CN2018/091950, Sep. 5, 2018, 6 pages.
Tencent Technology, IPRP, PCT/CN2018/091950, dated Dec. 24, 2019, 7 pages.

\* cited by examiner

IMAGE DISPLAY METHOD AND DEVICE

CROSS-REFERENCE TO RELATED APPLICATIONS

This application is a continuation application of PCT/CN2018/091950, entitled "IMAGE DISPLAY METHOD AND APPARATUS" filed on Jun. 20, 2018, which claims priority to Chinese Patent Application No. 201710475231.1, entitled "IMAGE DISPLAY METHOD AND APPARATUS" and filed with the China National Intellectual Property Administration on Jun. 21, 2017, both of which are incorporated by reference in their entirety.

FIELD OF THE TECHNOLOGY

Embodiments of this application relate to the field of images, and more specifically, to an image display method and apparatus.

BACKGROUND OF THE DISCLOSURE

Augmented reality (AR) is a brand new human-computer interaction technology. An AR technology is overlaying a real scenario and a virtual object to the same frame or space in real time. The virtual object may be a static image, that is, a location of the virtual object in the real scenario does not change. The virtual object may further be a dynamic image, that is, the virtual object has a movement track in the real scenario. Usually, a location of the movement track changes relative to the real scenario as a posture of a terminal device changes.

SUMMARY

Embodiments of this application provide an image display method and apparatus, to improve fidelity of the AR technology, and improve user experience.

An embodiment of this application provides an image display method performed at a terminal device having one or more processors and memory storing programs to be executed by the one or more processors, the method comprising:

capturing, by the terminal device, a first image;

obtaining, by the terminal device, information about a first posture, the first posture being a posture of the terminal device when the terminal device captures the first image;

determining, by the terminal device, a first movement track for a virtual object to move from a first position to a second position in a virtual world according to the information about the first posture;

presenting, by the terminal device, the first image as a background image of the virtual world; and dynamically rendering the virtual object to move along the first movement track in the first image, so that the virtual object moves vertically to the horizontal plane in the real world regardless of the first posture of the terminal device.

Therefore, in the image display method provided in this embodiment of this application, according to information about a first posture of a terminal device, a first movement track of a virtual object from a first position to a second position on a display plane of a display of the terminal device when the terminal device is in the first posture is determined, so that the virtual object can move along the first movement track in the virtual world including the first image shot by using a camera. Therefore, when a posture of the terminal device changes, movement tracks corresponding to the virtual object in different postures may change relative to the terminal device, but not change relative to a real environment. That is, a movement track of the virtual object observed by a user in a real scenario as represented by the first image does not change, thereby improving fidelity of the AR technology, and improving user experience.

An embodiment of this application further provides an image display apparatus, which may include units configured to perform steps in the aforementioned method in the embodiments.

An embodiment of this application further provides an image display terminal device, which may include a memory and a processor. The memory is configured to store a computer program, and the processor is configured to invoke the computer program from the memory and run the computer program, so that the image display terminal device performs the aforementioned method in the embodiments.

An embodiment of this application further provides a computer program product. The computer program product includes: computer program code, and the computer program code, when run by a processor of a terminal device, causes the terminal device to perform the aforementioned method in the embodiments.

An embodiment of this application further provides a non-transitory computer readable storage medium. The computer readable storage medium stores a program, and the program causes a terminal device to perform the aforementioned method in the embodiments.

DESCRIPTION OF EMBODIMENTS

The technical solutions of the embodiments of this application may be applied to various terminal devices (also referred to as user devices) supporting angle measurement, such as a mobile phone, a bracelet, a tablet computer, a notebook computer, an ultra-mobile personal computer (UMPC), a personal digital assistant (PDA) device, a handheld device having a wireless communications function, a computing device or another processing device connected to a wireless modem, an in-vehicle device, a wearable device, but the devices are not limited to communications terminals.

Figure 1:
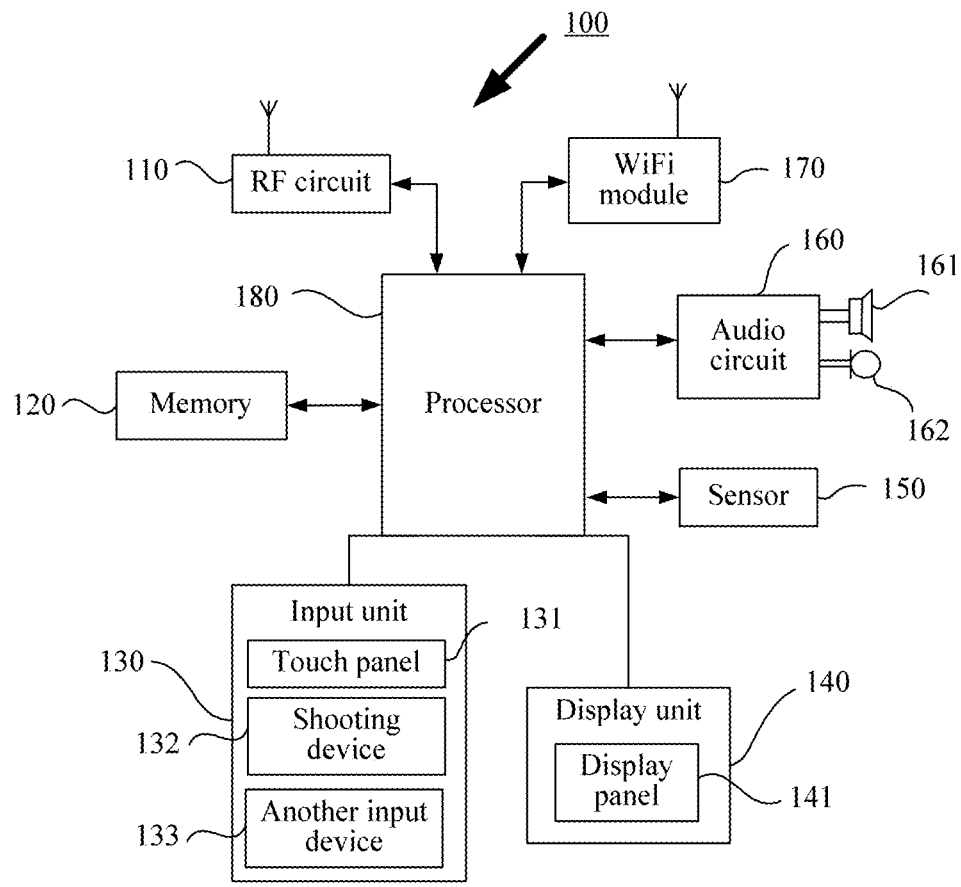
FIG. 1 is a schematic structural diagram of a terminal device applicable to an image display method according to an embodiment of this application.

FIG. 1 is a schematic diagram of a terminal device according to an embodiment of this application. The terminal device 100 may include components such as a radio frequency (RF) circuit 110, a memory 120, an input unit 130, a wireless fidelity (Wi-Fi) module 170, a display unit 140, a sensor 150, an audio circuit 160, a processor 180, and a power supply 190. A person skilled in the art may understand that the structure of the terminal device shown in FIG. 1 is only an example rather than limiting. The terminal device may further include more or fewer components than those shown in the figure, or some components may be combined, or a different component deployment may be used.

The memory 120 may be configured to store a software program and module. The processor 180 runs the software program and module stored in the memory 120, to implement various functional applications and data processing of the mobile phone. The memory 120 may include a high-speed random access memory, and may further include a non-volatile memory such as at least one magnetic disk storage device, a flash memory device, or another volatile solid storage device.

The display unit 140 may be configured to display information input by a user or information provided for a user, and various menus of the mobile phone.

The terminal device 100 may further include at least one sensor 150, such as a motion sensor 151, a range sensor 152, and another sensor. The motion sensor 151 may include a posture sensor, such as an angular speed sensor (also referred to as a gyroscope). When configured in the mobile phone, the angular speed sensor may measure a rotating angular speed during deflection and inclination of the mobile phone in a movement state. Therefore, the gyroscope may precisely analyze and determine an actual action of the user using the mobile phone, and further perform a corresponding operation on the mobile phone. The motion sensor 151 may further include a gravity sensor. The gravity sensor uses an elastic sensitive element to make a cantilever shifter, and uses an energy storage spring made by an elastic sensitive element to drive electrical contacts, to convert a change of gravity into a change of an electrical signal, such as: intelligent switches between portrait and landscape orientation of the mobile phone, orientations of shot photos, or gravity sensing games (such as steel ball rolling). The motion sensor 151 may further include an acceleration sensor. The acceleration sensor may detect the magnitude of acceleration in directions (which are triaxial generally), may detect the magnitude and direction of gravity when the acceleration sensor is at rest, and may be configured to identify an application of a posture of the mobile phone, vibrate to identify related functions, and the like, such as: switches between portrait and landscape orientation, related games, magnetometer posture calibration, step counts, knocks, angles of placing location orientations of the mobile phone. The motion sensor 151 may further include various other possible sensors, which are not listed one by one herein.

In the embodiments, any one or more types of motion sensors may be used to obtain a parameter related to the movement state of the mobile phone, such as: whether the mobile phone is in a movement state, the inclination of the mobile phone, a deflection angle, and the like.

The processor 180 is the control center of the mobile phone, and is connected to various parts of the mobile phone by using various interfaces and lines. By running or executing the software program and/or module stored in the memory 120, and invoking data stored in the memory 120, the processor 180 performs various functions and data processing of the mobile phone, thereby performing overall monitoring on the mobile phone.

In the embodiments of this application, two coordinate systems are involved. One coordinate system is a relative coordinate system (that is, a coordinate system relative to the terminal device), that is, the device coordinate system described below. The other coordinate system is an absolute coordinate system, that is, the world coordinate system described below. One coordinate system is a relative coordinate system (that is, a coordinate system relative to the terminal device), that is, the user coordinate system described below.

Figure 2:
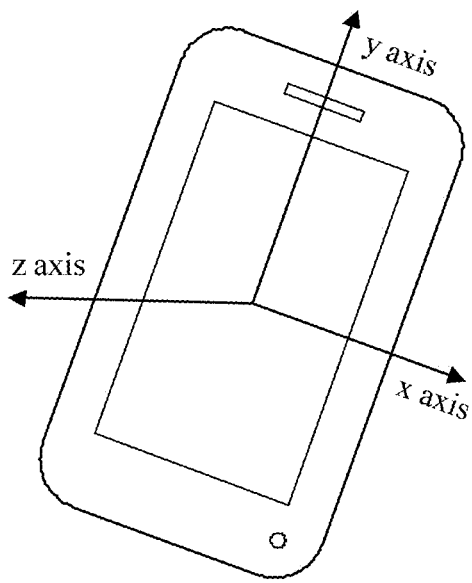
FIG. 2 is a schematic diagram of a device coordinate system according to an embodiment of this application.
Figure 3:
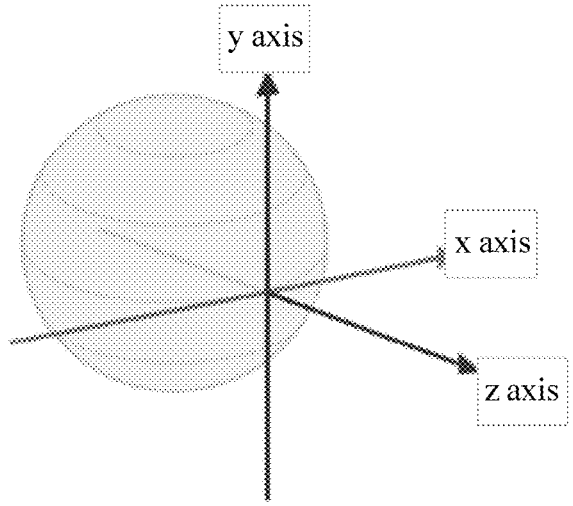
FIG. 3 is a schematic diagram of a world coordinate system according to an embodiment of this application.

The following briefly describes the two coordinate systems involved in the embodiments of this application with reference to FIG. 2 and FIG. 3.

1. Device Coordinate System

Data reflected by the device coordinate system is location information relative to a device, and the device coordinate system is a relative coordinate system. Specifically, when the device moves or rotates, a relative location of a device coordinate axis relative to the device does not change, or the device coordinate system changes as a posture of the device changes.

FIG. 2 shows a device coordinate system applied to the embodiments of this application. As shown in FIG. 2, when the device is in the posture shown in FIG. 2, three axes in the device coordinate system of the device are respectively: X axis pointing from left to right along the screen, Y axis pointing from bottom to top along the screen, and Z axis perpendicular to the screen and pointing the screen front to outside, that is, the screen back is a negative value of Z.

2. World Coordinate System

Data of the world coordinate system reflects location information of a device relative to the earth and a real environment, and the world coordinate system is an absolute coordinate system. When the device moves or rotates, a relative location between the world coordinate system and the device changes. FIG. 3 shows a three-dimensional world coordinate system applied to the embodiments of this application. As shown in FIG. 3, data of the three axes in the world coordinate system relative to the three-dimensional world coordinate system reflects the location information of the device relative to the earth and the real environment, and the world coordinate system is an absolute coordinate system. The X axis is parallel to the ground and points to the east; the Y axis is parallel to the ground and points to the direction to the North Pole; and the Z axis is perpendicular to the ground and points to the sky. Usually, any direction parallel to the ground is referred to as a horizontal direction, and a direction perpendicular to the ground is referred to as a gravity direction. For a moving device, a location of the device in the three-dimensional world coordinate system changes.

Figure 4:
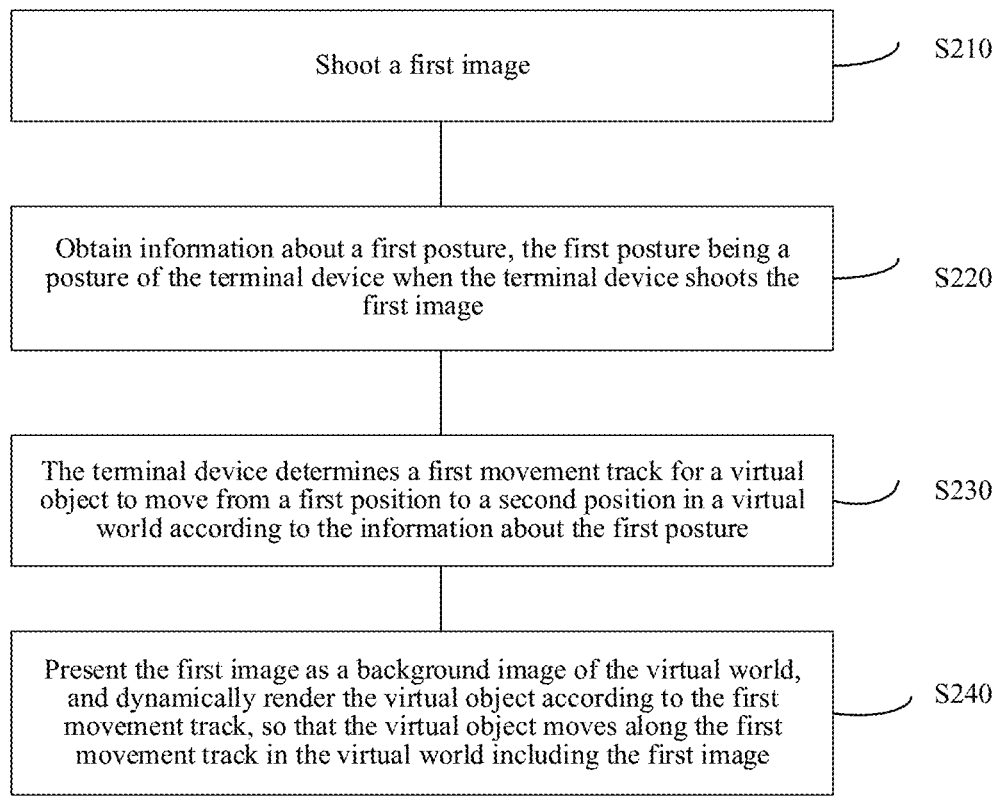
FIG. 4 is a schematic flowchart of an image display method according to an embodiment of this application.

FIG. 4 is a flowchart of an image display method according to an embodiment of this application. As shown in FIG. 4, the method may be performed by a terminal device 100 including a camera and a display. The method may include the following steps.

S210. Shoot a first image.

S220. Obtain information about a first posture, the first posture being a posture of the terminal device when the terminal device captures the first image.

S230. The terminal device determines a first movement track for a virtual object to move from a first position to a second position in a virtual world according to the information about the first posture.

S240. Present the first image as a background image of the virtual world, and dynamically render the virtual object according to the first movement track, so that the virtual object moves along the first movement track in the virtual world including the first image.

In S210, the terminal device may shoot the first image by using a capturing device 132. The first image is an image shot when the terminal device is in the first posture, the first image is frames in a real scenario, and the first image is also a static image.

In S220, the processor 180 may obtain the information about the first posture by using the motion sensor 151 (for example, an acceleration sensor), and the first posture is a posture of the terminal device when the terminal device captures the first image. The term capture here may mean shoot a picture via the camera of a device (e.g. a mobile phone equipped with a camera module) or view a scene from the viewfinder in a preview mode of a camera module. The first posture may be a posture of the terminal device with an offset relative to a standard posture. The standard posture may be a preset standard posture. The preset standard posture may be that a movement track of a virtual object seen by a user in a real scenario is a posture in a preset situation when the user holds the terminal device with a hand, and the like.

The information about the first posture may be an offset of the terminal device in the first posture relative to the preset standard posture. Specifically, the offset may be an included angle between the terminal device in the first posture and a standard direction (or a fixed axis), or the offset may be an offset of the terminal device in the first posture relative to a standard coordinate point, and the like.

In S230, the processor 180 may determine the first movement track according to the information about the first posture. The first movement track refers to a movement track of the virtual object on a display plane of the display 141 (or a display panel 141) when the terminal device is in the first posture.

In other words, the first movement track may also be understood as a display direction of the virtual object on the display plane. For example, if the virtual object is an image on an XY axis plane, the display direction may be a direction of a connection between a maximum coordinate value pixel point on the X axis and a minimum coordinate value pixel point on the X axis in pixel points of the image of the virtual object, or the display direction may be a direction of a connection between a maximum coordinate value pixel point on the Y axis and a minimum coordinate value pixel point on the Y axis in pixel points of the image of the virtual object.

In this embodiment of this application, a relative location between the first movement track and the terminal device 100 (or the device coordinate system) changes, and a relative location between the first movement track and the real environment (or the world coordinate system) does not change. That is, no matter which posture the terminal device 100 is in, the movement track of the virtual object observed by the user in the real scenario does not change.

The method in the embodiments may be used for displaying some movements of the virtual object with the relative location between the movement track and the real environment unchanged, for example, used for displaying falling of the virtual object under the effect of gravity, vertical uplifting of the virtual object (such as a balloon or a rocket), moving of the virtual object along a skyline direction, and other movements of various virtual objects using absolute directions (such as a skyline direction and a gravity direction) in the real scenario as references. In the embodiments, an attribute value may be set for various virtual objects, and the attribute value represents whether the relative location between the movement track of the virtual object and the real environment is unchanged. The terminal device may obtain the attribute value of a to-be-displayed virtual object, and use the attribute value to determine whether the method in the embodiments is needed to determine the movement track of the virtual object.

In this embodiment of this application, the first movement track is determined according to the information about the first posture. Logically, it may be understood as follows: When the terminal device is in the first posture, an offset of the first posture relative to the standard posture is an offset # A, the direction is a positive direction, and the terminal device adjusts the offset # A of the virtual object with the movement track in a negative direction, so that the movement track of the virtual object observed by the user is unchanged relative to the real environment.

The virtual object may be a 3D model in an AR application, or may be a virtual scenario of a game based on the AR technology, and the like. The embodiments of this application are not limited thereto.

In S240, when the terminal device 100 is in the first posture, the processor 180 (the processor herein may be a graphics processing unit) displays the first image in the display 141, and presents the virtual object in the display 141 according to the first movement track. In this way, in the first posture, the movement track seen by the user in the real scenario may be the same as that in a preset situation, that is, the movement track seen by the user in the real scenario may be the same as the movement track seen by the user in a preset standard posture in the real scenario.

Figure 5:
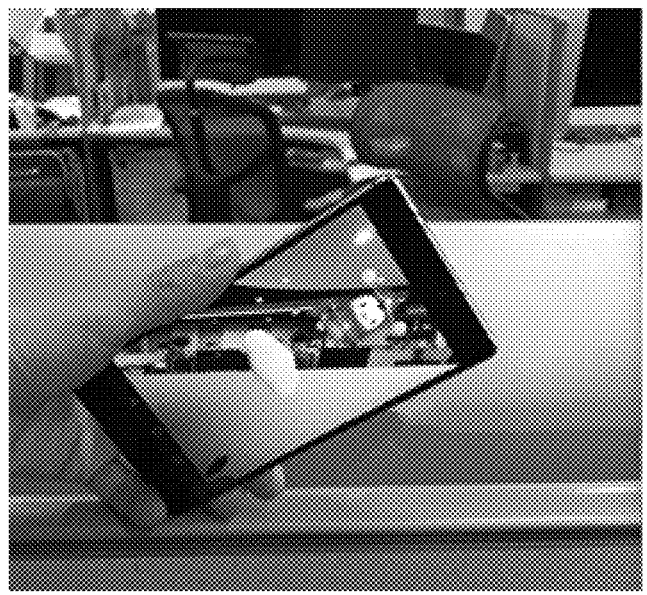
FIG. 5 is a movement state of a virtual object on a display plane of a display of a mobile phone at a first moment when the mobile phone is in a first posture in the existing technology.
Figure 6:
FIG. 6 is a movement state of a virtual object on a display plane of a display of a mobile phone at a first moment when the mobile phone is in a first posture according to an embodiment of this application.

The following describes the difference between the existing technology and the embodiments of this application in detail with reference to FIG. 5 and FIG. 6.

FIG. 5 shows a movement state of a virtual object on a display plane of a display of a mobile phone at a first moment when a terminal device is in a first posture in the existing technology.

When the terminal device 100 is in the preset standard state (for example, a display plane of the terminal device 100 is parallel to a gravity direction), the movement track (that is, a first movement track) of the virtual object on the display plane is parallel to the gravity direction. That is, actually, the first movement track observed by the user is flying down from the sky relative to the real environment, or the first movement track is parallel to a long edge of the terminal device 100.

When the terminal device 100 is in the first posture shown in FIG. 5 (for example, the terminal device 100 rotates by a first angle along the Z axis of the device coordinate system), the first movement track does not change relative to the terminal device 100. That is, the first movement track is parallel to the long edge of the terminal device 100, but the first movement track changes relative to the real environment. That is, an included angle exists between the first movement track and the horizontal direction. The first movement track observed by the user is not flying down from the sky relative to the real environment. The movement state of the virtual object in the first posture at a first moment is shown in FIG. 5. The location of the virtual object observed by the user in the real environment may be regarded as a location of any mass point in the first movement track of the virtual object in the real environment.

FIG. 6 shows a movement state of a virtual object on a display plane of a display of a mobile phone at a first moment when a terminal device is in a first posture according to an embodiment of this application.

Likewise, when the terminal device 100 is in the preset standard state (for example, a display plane of the terminal device 100 is parallel to a gravity direction), the movement track (that is, a first movement track) of the virtual object on the display plane is parallel to the gravity direction. That is, actually, the first movement track observed by the user is flying down from the sky relative to the real environment, or the first movement track is parallel to a long edge of the terminal device 100.

When the terminal device 100 is in the first posture shown in FIG. 6 (for example, the terminal device 100 rotates by a first angle along the Z axis of the device coordinate system), the first movement track changes relative to the terminal device 100. That is, the first movement track is no longer parallel to the long edge of the terminal device 100, but the first movement track does not change relative to the real environment. That is, the first movement track is always parallel to the gravity direction. The first movement track observed by the user is also flying down from the sky relative to the real environment. The movement state of the virtual object in the first posture at a first moment is shown in FIG. 6. The location of the virtual object observed by the user in the real environment may be regarded as a location of any mass point in the first movement track of the virtual object in the real environment.

Therefore, in the image display method provided in this embodiment of this application, according to information about a first posture of a terminal device, a first movement track of a virtual object on a display plane of a display of the terminal device when the terminal device is in the first posture is determined, so that the virtual object can move along the first movement track in the virtual world including the first image shot by using a camera. Therefore, when a posture of the terminal device changes, movement tracks corresponding to the virtual object in different postures may change relative to the terminal device, but not change relative to a real environment. That is, a movement track of a virtual object observed by a user in a real scenario does not change, thereby improving fidelity of the AR technology, and improving user experience.

In this embodiment of this application, the first image may be any image in images shot by the terminal device by using a camera at any moment, that is, the image is a static image. Likewise, the first posture may be any posture in postures of the terminal device at any moment, and the terminal device may obtain information about the terminal device in the posture at any moment, to determine movement tracks of the virtual object on the display plane in different postures. For the specific process of "the terminal device determines the first movement track according to the information about the first posture", there may be a plurality of implementations, which are described in detail subsequently.

In addition, as an example rather than limiting, the embodiments of this application may also be applied to a video display scenario, that is, a scenario in which the virtual object is presented while a video is displayed on the display plane.

In the video display scenario, the video may be shot by using the camera, the video includes at least one frame of image, and the first image is any frame of image in the video. The manner for processing each frame of image in the video by the terminal device is similar to the manner for processing the first image by the terminal device. Alternatively, the manner for displaying each frame of image in the video by the terminal device and presenting the movement track of the virtual object on the display plane is similar to the manner for displaying the first image by the terminal device and presenting the movement track of the virtual object on the display plane. This is not described herein again.

In some embodiments, the obtaining, by the terminal device, information about a first posture includes:

determining, by the terminal device, a first direction, where the first direction is a direction of a preset first axis in a device coordinate system of the terminal device in the first posture in a world coordinate system;

determining, by the terminal device, a second direction, where the second direction is a direction of a preset second axis in the world coordinate system; and using, by the terminal device, information about an included angle between the first direction and the second direction as the information about the first posture.

Specifically, as described above, the device coordinate system is relative to the device (that is, the terminal device 100), a location relationship between the device coordinate system and the device does not change as the posture of the device changes, and the world coordinate system is location information of the device relative to the earth and a real environment, and is an absolute coordinate system.

The information about the first posture specifically includes an included angle between two directions (that is, a first direction and a second direction). When the terminal device 100 is in different postures, a preset first axis in the device coordinate system of the terminal device 100 relative to the first direction is fixed, but a direction relative to the world coordinate system changes as the posture of the terminal device 100 changes.

Figure 7:
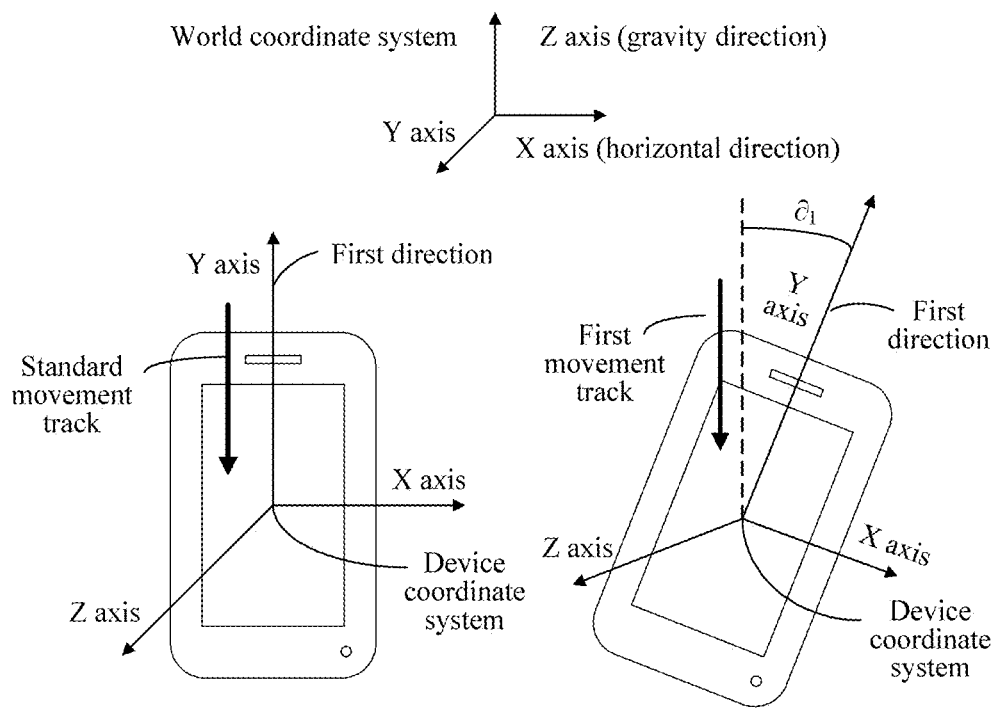
FIG. 7 is a schematic indicating diagram of location relationships among a world coordinate system, a device coordinate system, a standard movement track, and a first movement track according to an embodiment of this application.

FIG. 7 is a schematic indicating diagram of location relationships among a world coordinate system, a device coordinate system, a standard movement track, and a first movement track according to an embodiment of this application. In FIG. 7, there are two coordinate systems, one is a world coordinate system, and the other is a device coordinate system.

The preset first axis may be an axis parallel to a long edge of the terminal device 100, that is, the Y axis shown in the device coordinate system in FIG. 7. The first direction is parallel to the first axis.

As an example rather than limiting, the preset first axis may also be an axis parallel to a short edge of the terminal device 100 (that is, the X axis in the device coordinate system shown in FIG. 7). The embodiments of this application are not limited thereto.

The preset second axis is any axis in the world coordinate system, the second axis may be the Z axis in the world coordinate system shown in FIG. 7, and correspondingly, the second direction may be a gravity direction.

As an example rather than limiting, the second axis may be the X axis or Y axis in the world coordinate system shown in FIG. 7, and correspondingly, the second direction may be any two directions perpendicular to each other parallel to the horizontal plane.

In FIG. 7, when the terminal device 100 is in the posture shown in the left diagram, the first direction is parallel to the first axis of the terminal device 100, and the first direction is parallel to the gravity direction in the world coordinate system (that is, the Z axis in the world coordinate system); and when the terminal device 100 is in the posture shown in the right diagram, the first direction is still parallel to the first axis, but the first direction is no longer parallel to the gravity direction in the world coordinate system. An included angle between the first direction and the gravity direction is a first included angle, that is, the included angle $\partial_1$ shown in FIG. 7.

In addition, the display plane remains parallel or approximately parallel to a preset first plane in the device coordinate system, and the first plane may be a plane constructed by the long edge and the short edge of the terminal device 100.

Therefore, in the image display method provided in this embodiment of this application, when the terminal device is in the first posture, the first movement track is determined by using the included angle between two directions (that is, the first direction and the second direction) only, so that when the posture of the terminal device changes, not only movement tracks corresponding to the virtual object in different postures do not change relative to the real environment (or the world coordinate system), but also implementation complexity can be effectively reduced, thereby reducing complexity of a calculation process.

Meanwhile, by using the included angle between the two directions only, in a moving process of the terminal device, the virtual object can be always presented on the display plane of the terminal device (or frames of the first image). It is avoided that when the terminal device moves in a larger range, the virtual object is no longer presented on the display plane, thereby further effectively improving user experience.

In some embodiments, the second direction is a gravity direction in the world coordinate system.

That is, in this embodiment of this application, the gravity direction in the world coordinate system may be used as a standard reference direction.

In this embodiment of this application, there may be a plurality of specific manners for determining the first movement track according to the information about the first posture by the terminal device. In some embodiments, the method further includes:

obtaining a standard movement track, where the standard movement track includes a movement track of the virtual object in the virtual world on the display plane in a preset standard posture; and the determining a first movement track of the virtual object moving from a first position to a second position in the virtual world according to the information about the first posture includes:

determining the first movement track according to the information about the first posture and the standard movement track.

Specifically, the standard movement track may also be understood as a movement track that is preset by a system and that is of the virtual object observed by the user in the real environment. A location relationship between the standard movement track and the first movement track relative to the device coordinate system of the terminal device 100 is different.

Using FIG. 7 as an example, it is assumed that the left diagram represents that the current posture of the terminal device 100 is a standard posture, locations of the standard movement track and the device coordinate system of the terminal device 100 are shown in the figure, and the standard movement track is parallel to the first axis; and the right diagram represents that the current posture of the terminal device 100 is a first posture, and locations of the first movement track and the device coordinate system of the terminal device 100 are shown in the figure, and are completely different from the locations of the standard movement track and the device coordinate system of the terminal device 100. Most obviously, the first movement track and the gravity direction are not parallel, but form an angle.

The processor 180 may determine the first movement track according to the information about the first posture (further, according to the first included angle between the first direction and the second direction) and the standard movement track.

For example, the processor 180 may perform inversion by using a related parameter used for representing the first included angle, and determine a location relationship between the standard movement track and the device coordinate system according to a calculation result, to determine the first movement track.

In this embodiment of this application, the standard movement track may be obtained by using the following manner:

In some embodiments, the terminal device obtains second user operation information, where the second user operation information is used for indicating a first shape.

The terminal device determines the standard movement track according to the second user operation information, so that the standard movement track corresponds to the first shape.

The second user operation information may be a touch operation of a user (marked as a touch operation # A for ease of distinguishing and understanding). The touch operation # A may be a slide operation, that is, a track formed by the slide operation a successive slide track, and the slide track corresponds to the first shape. The terminal device may determine the first shape based on the slide track, to determine the standard movement track, or the slide track may represent a specific track curve of the standard movement track.

As an example rather than limiting, the touch operation # A may be a click operation, that is, the terminal device may detect a plurality of (at least two) touch points clicked by the user. In this case, the terminal device may determine the first shape based on the plurality of touch points, to determine the standard movement track.

For example, the plurality of touch points may be connected as a successive curve or straight line, and the terminal device may use the curve or straight line as the first shape, to determine the standard movement track according to the first shape.

As an example rather than limiting, the touch operation # A may be text information input by the user, and the text information may be identifiers corresponding to different standard movement tracks. In this case, the terminal device may store a plurality of standard movement tracks, and may present indexes of different standard movement tracks (for example, names or thumbnails of the plurality of standard movement tracks) on a human-computer interaction window (or a human-computer interaction interface). In this case, the terminal device may use the standard movement track selected by the user as the standard movement track.

As an example rather than limiting, the second user operation information not only may indicate the first shape, but also may indicate a slide direction of the user on a display plane. That is, the touch operation # A is the slide direction of the user on the display plane. The slide direction # A may represent a movement direction of the standard movement track.

For example, if the sensor in the terminal device 100 detects that the slide direction is sliding from left to right of the display plane, the movement direction of the standard movement track may be parallel to the horizontal direction. For another example, if the sensor in the terminal device 100 detects that the slide direction is sliding from top to bottom of the display plane, the movement direction of the standard movement track may be parallel to the gravity direction.

In some embodiments, the method of determining, by the terminal device, a first movement track according to the information about the first posture may include:

obtaining mapping relationship information, where the mapping relationship information is used for indicating a mapping relationship between identifiers a plurality of types of postures and a plurality of types of movement tracks; and the determining a first movement track of the virtual object moving from a first position to a second position in the virtual world according to the information about the first posture includes:

determining, according to an identifier of the first posture, the first movement track corresponding to the identifier of the first posture from the mapping relationship.

The memory inside the terminal device 100 may store a plurality of the mapping relationships, or may obtain a mapping relationship from system software or application software in the terminal device 100. The mapping relationship is used for indicating the mapping relationship between identifiers of a plurality of types of postures and a plurality of types of movement tracks. The mapping relationship may be a one-to-one correspondence, or may be a mapping relationship that identifiers of at least two types of postures correspond to one type of movement track.

For example, using FIG. 7 as an example, when the terminal device 100 is in the posture of the left diagram (that is, the standard posture), the movement track of the virtual object on the display plane is parallel to the Y axis. When the terminal device 100 is in the posture of the right diagram (that is, the first posture), the movement track of the virtual object on the display plane and the Y axis form an included angle, That is, the standard posture corresponds to the movement track in the left diagram, and the first posture corresponds to the movement track in the right diagram. The terminal device corresponds to two different types of movement tracks in the foregoing two postures. Therefore, the identifier of the standard posture may be 1, and the identifier of the first posture may be 2.

For another example, the angle range is divided, that is, 360 is evenly divided. Postures within the same angle range use the same identifier, and angles between different angle ranges use different identifiers, to identify different postures.

For another example, the angle range is divided, that is, 360 is evenly divided. Different postures within the same angle range use different identifiers, but different identifiers corresponding to the different postures within the same angle range correspond to one type of movement track.

Further, the processor 180 may determine, according to an identifier of the first posture, the first movement track corresponding to the identifier of the first posture from the mapping relationship.

In some embodiments, the method of determining, by the terminal device, a first movement track according to the information about the first posture may include:

determining, by the terminal device, a preset candidate movement track as the first movement track when the included angle is within the preset first angle range; and determining, by the terminal device, the first movement track according to the candidate movement track and a difference between the included angle and a first boundary value of the first angle range, when the included angle is outside the preset first angle range.

When a plurality of included angles corresponding to a plurality of types of postures of the terminal device is all within the first angle range, the plurality of types of postures corresponds to the same type of movement track, that is, the candidate movement track. The candidate movement track may be a preset standard movement track, or may be any preset movement track. In this case, the terminal device uses the candidate movement track as the first movement track. That is, the terminal device may not adjust the angle of the virtual object in the current posture, so that loads of the processor 180 can be reduced to some extent.

When a plurality of angles corresponding to the plurality of types of postures of the terminal device is all within the first angle range, the plurality of types of postures corresponds to a plurality of types of movement tracks, that is, different postures correspond to different movement tracks. The terminal device may determine the first movement track according to an included angle between the current posture and the standard posture and a difference between the included angle and a boundary value of the first angle range. That is, the terminal device needs to adjust the angle of the virtual object in the current posture, so that the movement track of the virtual object observed by the user is unchanged relative to the real environment.

In this embodiment of this application, the standard movement track may be a movement track of the virtual object in frames displayed by the terminal device when the terminal device is in the standard posture, or the standard movement track may be a movement track of the virtual object on the display plane of the terminal device when the terminal device is in the standard posture.

In addition, the first angle range may be a preset value, and different values may be given to the first angle rang according to actual needs. Theoretically, a smaller first angle range can more help improve user experience.

Figure 8:
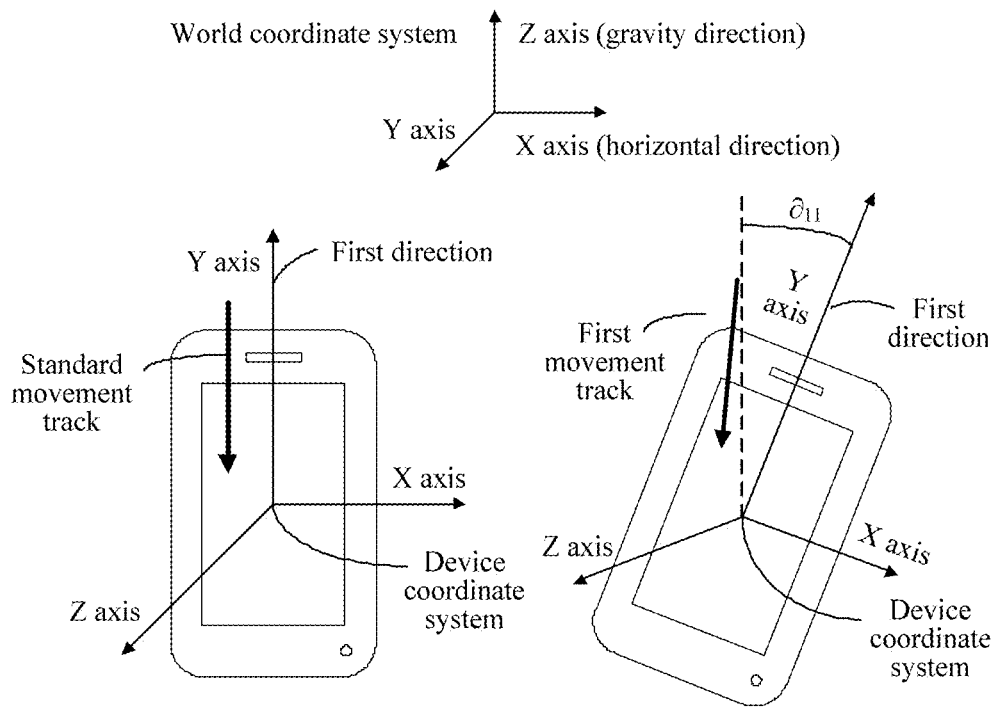
FIG. 8 is a schematic indicating diagram of location relationships among a world coordinate system, a device coordinate system, a standard movement track, and a first movement track according to another embodiment of this application.
Figure 9A:
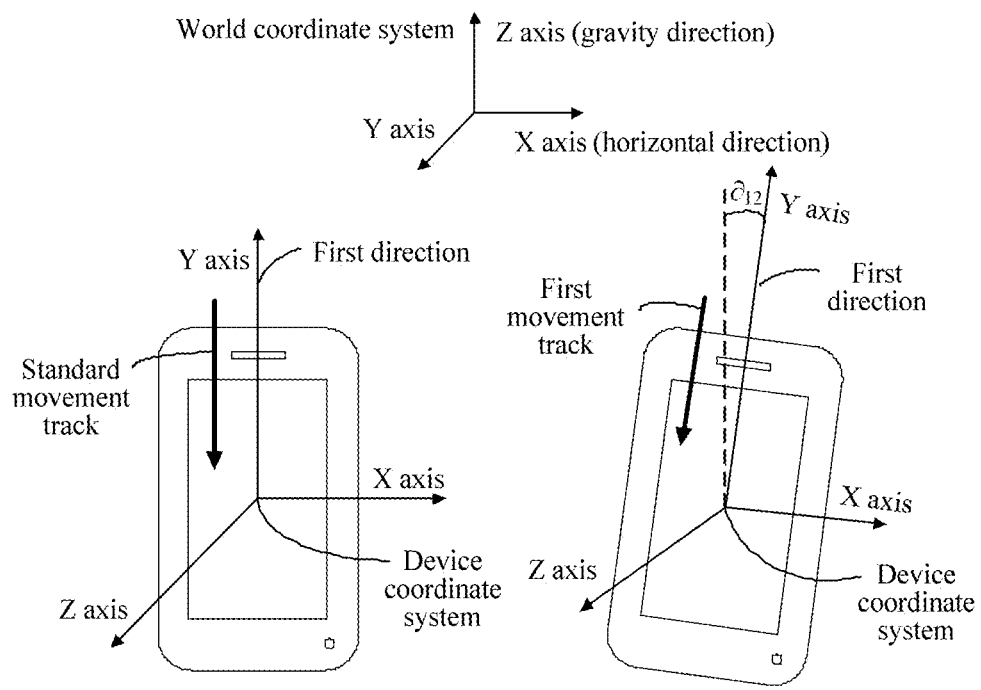
FIG. 9A and FIG. 9B are schematic indicating diagrams of location relationships among a world coordinate system, a device coordinate system, a standard movement track, and a first movement track according to still another embodiment of this application.
Figure 9B:
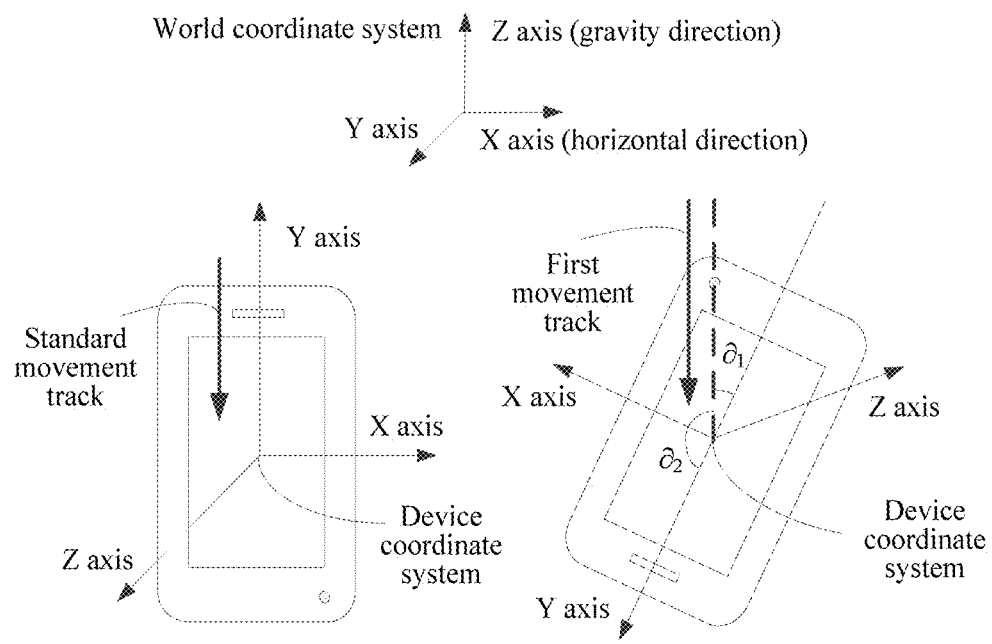

The following describes that the terminal device 100 determines the first movement track according to the information about the first posture by using Manner 3 in detail with reference to FIG. 8, FIG. 9A, and FIG. 9B.

FIG. 8 shows a schematic indicating diagram of location relationships among a world coordinate system, a device coordinate system, a standard movement track, and a first movement track according to another embodiment of this application. As shown in FIG. 8, when the terminal device 100 is in the posture shown in the left diagram (that is, the standard posture), the first direction is parallel to the first axis of the terminal device 100, and the first direction is parallel to the gravity direction in the world coordinate system (that is, the Z axis in the world coordinate system); and when the terminal device 100 is in the posture shown in the right diagram (marked as a posture # A, that is, an example of the first posture), the first direction is still parallel to the first axis, but the first direction is no longer parallel to the gravity direction in the world coordinate system. An included angle between the first direction and the gravity direction is the included angle $\partial_{11}$ shown in FIG. 8.

The terminal device 100 obtains the included angle $\partial_{11}$ of the terminal device 100 in the posture # A by using the sensor, and the processor 180 determines that the included angle $\partial_{11}$ is outside the first angle range, so that the terminal device 100 determines the first movement track according to the included angle $\partial_{11}$, and the first movement track changes slightly relative to the real environment.

When the first angle range is $-5°<\partial_a<5°$, and the included angle $\partial_{11}$ of the terminal device 100 in the posture # A relative to the standard posture is 25°, the included angle $\partial_{11}$ is outside the first angle range, a first boundary value of the first angle range is 5°, and a difference between the included angle $\partial_{11}$ and the first boundary value is 20°. The processor 180 determines the first movement track according to the included angle of 20°, and location relationships among the first movement track, the first direction in the device coordinate system, and the gravity direction are shown in FIG. 8. The location relationship between the first movement track and the first direction is no longer a parallel relationship, and a smaller angle exists between the first movement track and the gravity direction, and may be regarded as a difference between the included angle $\partial_{11}$ and the first boundary value of the first angle range.

As described above, a smaller first angle range can more help improve user experience. When the first angle range is 0 degrees, the movement track of the virtual object is always unchanged relative to the real environment, and in this case, the user experience is the highest.

As an example rather than limiting, in this case, when the included angle is outside the first angle range, the terminal device may also determine the first movement track according to the included angle.

For example, in the foregoing example, the included angle $\partial_{11}$ is 25°, and the processor 100 directly determines the first movement track according to the included angle $\partial_{11}$. The degree by which the terminal device 100 rotates relative to the standard posture is the degree by which the virtual object is adjusted reversely.

FIG. 9A shows a schematic indicating diagram of location relationships among a world coordinate system, a device coordinate system, a standard movement track, and a first movement track according to still another embodiment of the present invention. As shown in FIG. 9A, when the terminal device 100 is in the posture shown in the left diagram (that is, the standard posture), the first direction is parallel to the first axis of the terminal device 100, and the first direction is parallel to the gravity direction in the world coordinate system (that is, the Z axis in the world coordinate system); and when the terminal device 100 is in the posture shown in the right diagram (marked as a posture # B, that is, another example of the first posture), the first direction is still parallel to the first axis, but the first direction is no longer parallel to the gravity direction in the world coordinate system. An included angle between the first direction and the gravity direction is the included angle $\partial_{12}$ shown in FIG. 9A.

The terminal device 100 obtains the included angle $\partial_{12}$ of the terminal device 100 in the posture # B by using the sensor, and the processor 180 determines that the included angle $\partial_{12}$ is within the first angle range, so that the terminal device 100 determines the first movement track according to the included angle $\partial_{12}$, and the first movement track does not change relative to the real environment. In this way, the standard posture corresponds to the movement track in the left diagram, and the first posture corresponds to the movement track in the right diagram.

When the first angle range is $-5°<\partial_a<5°$, the included angle $\partial_{12}$ of the terminal device 100 in the posture # B relative to the standard posture is 3°, so that the included angle $\partial_{12}$ is within the first angle range, and the terminal device determines the standard movement track as the first movement track. In this case, the location relationships among the first movement track, the first direction in the device coordinate system, and the gravity direction are shown in FIG. 8: the location relationship between the first movement track and the first direction is still a parallel relationship, and an angle exists between the first movement track and the gravity direction and may be regarded as the included angle $\partial_{12}$.

Likewise, as described above, a smaller first angle range can more help improve user experience. When the first angle range is 0 degrees, the movement track of the virtual object is always unchanged relative to the real environment, and ion this case, the user experience is the highest.

As an example rather than limiting, the terminal device may also determine the first movement track according to the information about the first posture based on other manners.

For example, when offsets between different postures are less than an offset range, the offsets may correspond to one type of movement track, and a smaller offset can more help improve user experience.

When the offset between a former posture and a latter posture of the terminal device is 1°, so that the former posture and the latter posture correspond to the same movement track, and the terminal device uses a movement track corresponding to the former posture as a movement track corresponding to the latter posture.

For another example, the terminal device may sum up offsets of different postures relative to the standard posture, and obtain an average offset of the terminal device within an offset range, to determine the movement track of the virtual object on the display plane according to the average offset.

In some embodiments, the obtaining, by the terminal device, information about a first posture includes:

determining, by the terminal device, an included angle by which the terminal device rotates in a process of rotating about a preset third axis from a preset standard posture to be in the first posture; and using, by the terminal device, information about the included angle as the information about the first posture.

The first posture may be a posture of the terminal device 100 in the standard posture after the terminal device 100 rotates about the third axis, and the third axis is the Z axis shown in FIG. 2, so that the terminal device 100 determines an included angle in the rotation process of the terminal device 100 as the information about the first posture.

In this way, the terminal device rotates about the third axis perpendicular to the display plane, which may meet use habits of the user using the terminal device, so that the display plane of the terminal device may face the user (or the display plane of the terminal device is within a view range of the user), to make the image displayed on the display plane and the virtual object be capable of being observed by the user.

In some embodiments, the standard posture includes a posture of the terminal device when the preset first axis in the device coordinate system of the terminal device is parallel or approximately parallel to a horizontal plane, where the first axis is parallel to a width direction or a length direction of the terminal device.

Figure 10:
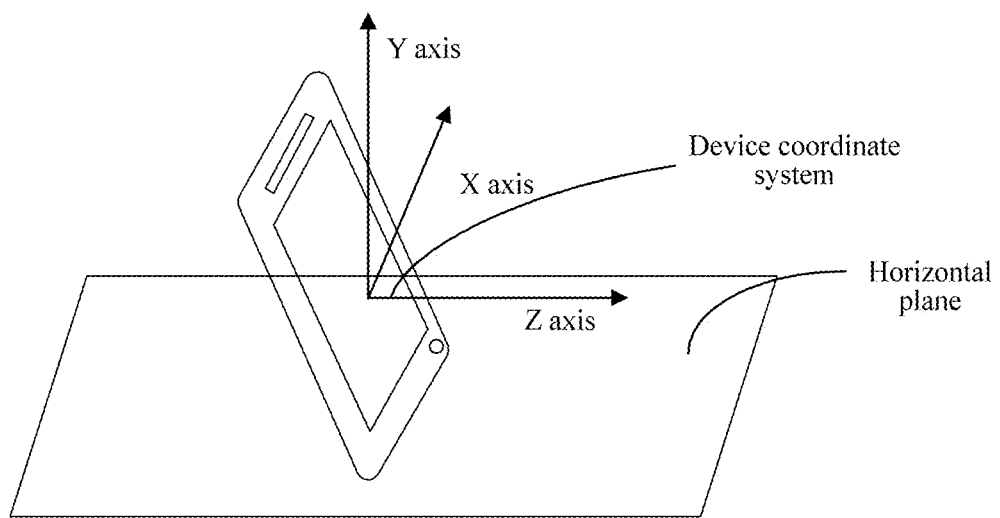
FIG. 10 is a schematic state diagram of a standard posture of a mobile phone according to an embodiment of this application.

The standard posture may include the posture of the terminal device 100 shown in FIG. 10, and the first axis is parallel to the width direction of the terminal device 100, or the first axis is parallel to a width direction of a display of the terminal device 100, the first axis is the X axis in the device coordinate system shown in FIG. 10, and the first axis is parallel or approximately parallel to the horizontal plane shown in FIG. 10.

Figure 11:
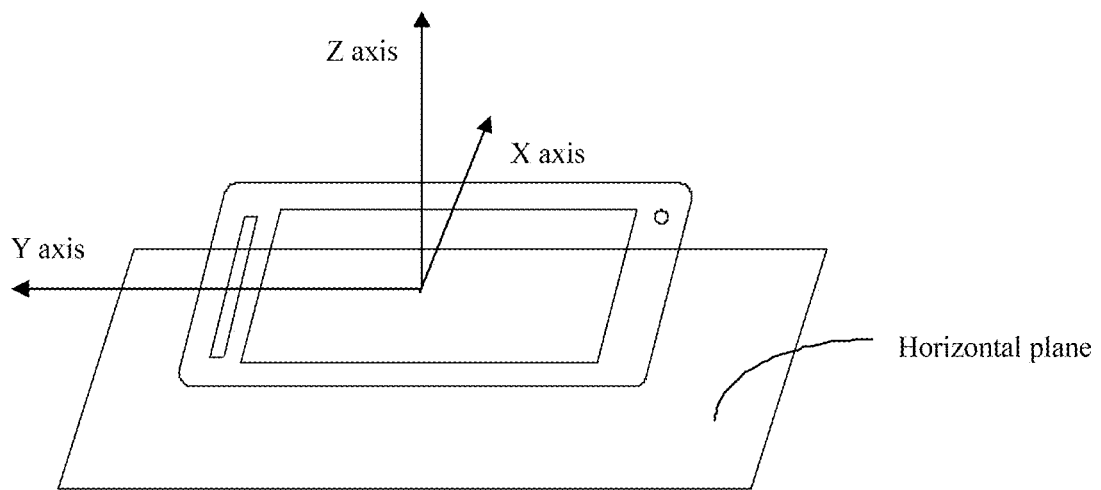
FIG. 11 is a schematic state diagram of a standard posture of a mobile phone according to another embodiment of this application.

Alternatively, the standard posture may include the posture of the terminal device 100 shown in FIG. 11, and the first axis is parallel to the length direction of the terminal device 100, or the first axis is parallel to the length direction of a display of the terminal device 100, the first axis is the Y axis in the device coordinate system shown in FIG. 11, and the first axis is parallel or approximately parallel to the horizontal plane shown in FIG. 11.

Figure 12:
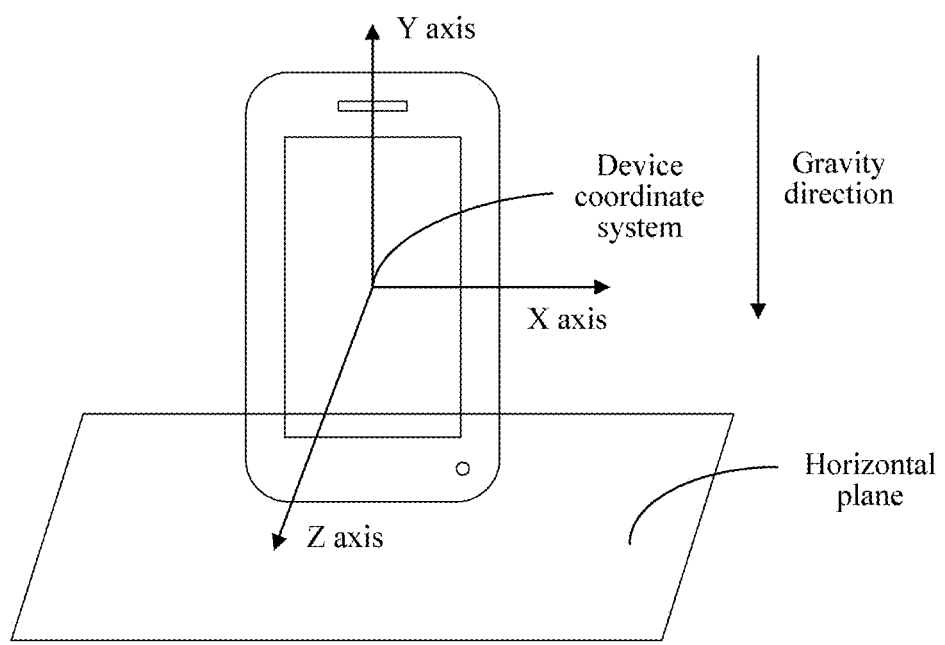
FIG. 12 is a schematic state diagram of a standard posture of a mobile phone according to still another embodiment of this application.

The standard posture may include the posture of the terminal device 100 shown in FIG. 12. Likewise, the first axis is parallel to the width direction of the terminal device 100, or the first axis is parallel to a width direction of a display of the terminal device 100. The first axis is the X axis in the device coordinate system shown in FIG. 12. The first axis is parallel or approximately parallel to the horizontal plane shown in FIG. 12. and the first axis is perpendicular or approximately perpendicular to the gravity direction.

It should be understood that, the standard posture shown in the foregoing figures are merely for exemplary description. The embodiments of the present invention are not limited thereto. Any standard posture meeting the foregoing features falls within the protection scope of the embodiments of the present invention.

In some embodiments, the obtaining, by the terminal device, information about a first posture includes:

obtaining an included angle between a preset first axis in a device coordinate system of the terminal device in the first posture and a preset second axis in a world coordinate system, where the included angle is within a preset second angle range;

obtaining orientation information of the first axis in the device coordinate system in the first posture;

using information about the included angle as the information about the first posture when the orientation information indicates a preset first orientation; and performing preset conversion processing on the included angle when the orientation information indicates a preset second orientation, to obtain a second included angle, so that information about the second included angle is outside a preset second angle range and within a preset third angle range, and using the information about the second included angle as the information about the first posture.

For example, the terminal device obtains an included angle between the Y axis in the device coordinate system of the terminal device in the first posture and the Y axis in the world coordinate system by using the sensor. A range of the included angle is a preset second angle range, for example, from minus 90 degrees to plus 90 degrees. The terminal device obtains an orientation of the Y axis in the device coordinate system in the first posture by using the sensor, for example, the direction indicated by the positive direction of the Y axis is upward or downward. When it is determined that the Y axis is downward, it indicates that the Y axis rotates by over 90 degrees, so that the terminal device performs conversion processing on the included angle, to convert the included angle into a second included angle. The second included angle is outside the second angle range and within the third angle range, and the third angle range may be from minus 180 degrees to plus 180 degrees. For example, as described in FIG. 9B, if the included angle between the Y axis in the device coordinate system of the terminal device in the first posture and the Y axis in the world coordinate system is 10 degrees, and the Y axis in the device coordinate system of the terminal device in the first posture is downward, 180 degrees are subtracted from the included angle of 10 degrees to obtain the second included angle of −170 degrees, as the information about the first posture.

In some embodiments, acceleration of gravity in axial directions in the device coordinate system of the terminal device may be obtained by using the sensor, to obtain orientation information of the axes. For example, when the front side of the terminal device (for example, one side including the screen) is placed upward horizontally, it may be obtained by using the sensor that acceleration of gravity of the X axis is 0, acceleration of gravity of the Y axis is 0, and acceleration of gravity of the Z axis is 9.81. When the front side of the terminal device is placed downward horizontally, it may be obtained by using the sensor that acceleration of gravity of the X axis is 0, acceleration of gravity of the Y axis is 0, and acceleration of gravity of the Z axis is −9.81. When the terminal device inclines to the left, acceleration of gravity of the X axis is a positive value. When the terminal device inclines to the right, acceleration of gravity of the X axis is a negative value. When the top of the terminal device is upward, acceleration of gravity of the Y axis is a negative value. When the top of the terminal device is downward, acceleration of gravity of the Y axis is a positive value.

In some embodiments, the method further includes:

obtaining, by the terminal device, first user operation information, where the first user operation information is generated according to a selection operation of a user for at least two postures; and determining, by the terminal device, the standard posture from the at least two postures according to the first user operation information.

In some embodiments, the terminal device 100 may store at least two alternative postures, and may present indexes of the at least two alternative postures (for example, names or thumbnails of the at least two alternative postures) on a human-computer interaction window (or a human-computer interaction interface).

In this way, the terminal device 100 may use the posture selected from the at least two alternative postures by the user as the standard posture. In this case, as an example rather than limiting, the user operation may be an operation performed by the user by using an input device such as a touchpad or a stylus.

In some embodiments, the first user operation information may also be a touch operation (marked as a touch operation # B for ease of distinguishing and understanding), and the touch operation # B may also be a slide direction, a click operation, or the like.

For example, if the probability of the amplitude of an included angle between the slide direction and the standard direction is within a threshold range, the terminal device 100 may be regarded to be in the standard posture.

It should be understood that, the foregoing example is merely for exemplary description. The embodiments of the present invention are not limited thereto. Any manner for determining the standard posture according to user operation indication information falls within the protection scope of the embodiments of the present invention.

In some embodiments, the first axis is parallel to any one of the following directions:
a length direction of the display, or
a width direction of the display, or
a length direction of the terminal device, or
a width direction of the terminal device.

In some embodiments, the determining, by the terminal device, a first movement track of the virtual object moving from a first position to a second position in the virtual world according to the information about the first posture includes:

performing, by the terminal device, preset conversion processing on the included angle when an actual rotation angle of the terminal device is outside a second angle range, so that the included angle on which the conversion processing has been performed is outside the second angle range and within the preset third angle range, where the second angle range is an angle range to which an angle obtained through calculation by using a quaternion or a rotation matrix used for representing rotation belongs; and determining, by the terminal device, the first movement track according to the included angle on which the conversion processing has been performed.

In some embodiments, whether the actual rotation angle of the terminal device is outside the second angle range may be determined by determining whether a relationship between the first axis of the terminal device and a preset plane meets a preset condition. Herein, a pointing direction of the first axis refers to a direction pointed to by one end (an end representing a positive direction, or an end representing a negative direction) of the first axis.

For example, the first axis of the terminal device may be the Y axis, and the preset plane may be a horizontal plane. The preset condition may be that the Y axis points to the lower side of the horizontal plane.

For another example, the first axis of the terminal device may be the X axis, and the preset plane may be a vertical plane. The preset condition may be that the X axis points to the left side of the vertical plane.

As described above, the pointing direction of the first axis may be obtained by using the acceleration of gravity that is in the axial directions in the device coordinate system of the terminal device and that is obtained by the sensor. For example, if the acceleration of gravity of the Y axis is a negative value, it represents that the Y axis of the terminal device points to the upper side. If the acceleration of gravity of the Y axis is a positive value, it represents that the Y axis of the terminal device points to the lower side.

The second angle range may be a preset value, and may be an angle range to which an angle obtained through calculation by using a quaternion or a rotation matrix belongs. The third angle range is also preset. More specifically, generally, the quaternion or the rotation matrix may be used to represent information about the included angle. Because the angle range calculated according to the quaternion or the rotation matrix is $-90°\leq \partial_b \leq 90°$ (that is, the second angle range is $-90°\leq \partial_b \leq 90°$), in this way, if the top of the terminal device 100 is below the horizontal plane, or the first axis of the device coordinate system (for example, the Y axis) is below the horizontal plane, the angle calculated by using the quaternion with the second angle range of $-90°\leq \partial_b \leq 90°$ for a subsequent calculation process is wrong. Therefore, when the quaternion or the rotation matrix is used to represent the information about the included angle, the included angle may be adjusted by setting the second angle range, so that the processed included angle belongs to the third angle range, and the third angle range may be $-180°\leq \partial_c \leq 180°$. Therefore, the terminal device 100 determines the first movement track according to the processed included angle.

An example in which the second angle range is $-90°\leq \partial_b \leq 90°$ and the third angle range is $-180°\leq \partial_c \leq 180°$ used to describe preset change processing. For ease of distinguishing and understanding, an included angle before the change processing is marked as $\partial_1$, and an included angle after the change processing is marked as $\partial_2$.

For example, if the first axis (for example, the Y axis) of the device coordinate system is below the horizontal plane (that is, the Y axis points to the lower side of the horizontal plane), it indicates that an actual angle range of the terminal device 100 in the current posture is $-180°\leq \partial_c \leq 180°$: If the included angle $\partial_1$ calculated by using the quaternion or the rotation matrix belongs to $-90°\leq \partial_1 \leq 0°$, the processed included angle is $d_2=\partial_1+180°$. In this way, the angle range of the processed included angle $\partial_2$ is $90°\leq \partial_2 \leq 180°$. If the included angle $\partial_1$ calculated by using the quaternion or the rotation matrix belongs to $0°\leq \partial_1 \leq 90°$, $\partial_2=\partial_1-180°$. In this way, the angle range of the processed included angle $\partial_2$ is $-180°\leq \partial_2 \leq -90°$. For example, as described in FIG. 9B, if the included angle $\partial_1$ between the Y axis in the device coordinate system of the terminal device in the first posture and the Y axis in the world coordinate system is 10 degrees, and the Y axis in the device coordinate system of the terminal device points to the lower side of the horizontal plane, 180 degrees are subtracted from the included angle $\partial_1$ of 10 degrees to obtain the second included angle $\partial_2$ of $-170$ degrees, as the information about the first posture.

The foregoing describes the image display method according to the embodiments of the present invention in detail with reference to FIG. 1 to FIG. 12. The following describes the image display method of the embodiments of the present invention with reference to FIG. 13 and FIG. 14 by using two specific embodiments.

Figure 13:
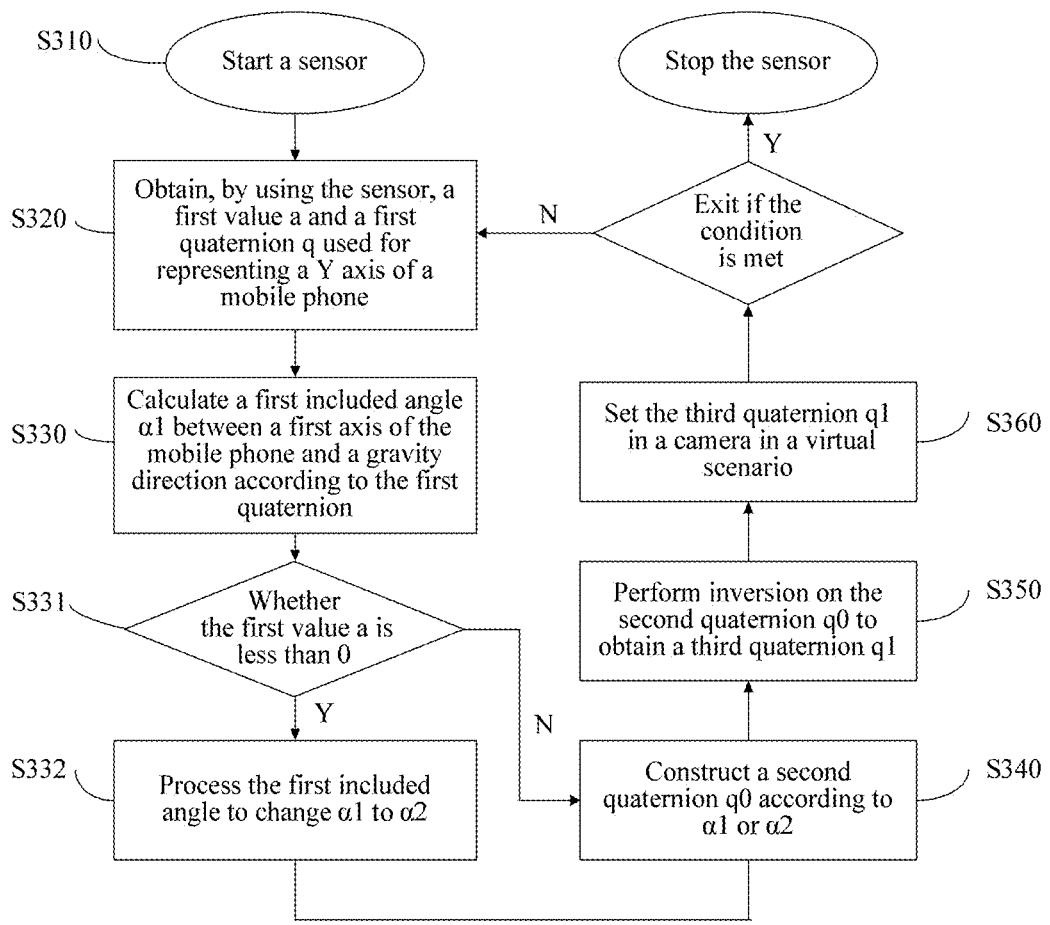
FIG. 13 is a schematic flowchart of an embodiment of this application described by using a quaternion used for representing rotation.

FIG. 13 shows a schematic flowchart of another embodiment of the present invention described by using a quaternion. An example in which the standard posture of the terminal device 100 is the posture shown in the left diagram in FIG. 7, and the first posture of the terminal device 100 is the posture shown in the right diagram in FIG. 7 (or the posture of the terminal device 100 after the terminal device 100 rotates about the third axis of the device coordinate system (that is, the Z axis in the device coordinate system shown in FIG. 7) from the standard posture by a first included angle) is used to describe the processes of the embodiments of the present invention in detail.

In S310, a motion sensor 151 is started.

In S320, the processor 180 obtains, by using the motion sensor 151, a first quaternion q used for representing a rotation change of the terminal device 100 in the first posture. The first quaternion q is used for representing rotation of a mobile phone 10.

In S330, the processor 180 calculates a first included angle $\partial_1$ between the first axis of the terminal device 100 (that is, the Y axis in the device coordinate system shown in FIG. 2) and the gravity direction according to the first quaternion q.

Because the second angle range calculated according to the quaternion is $-90°\leq\partial_b\leq90°$, in this way, if the top of the terminal device 100 is below the horizontal plane, or the first axis of the device coordinate system (that is, the Y axis) points to the lower side of the horizontal plane, the angle calculated by using a quaternion whose angle range is $-90°\leq\partial_b\leq90°$ for a subsequent calculation process is wrong.

Therefore, optionally, in S320, the terminal device 100 may further obtain a first value a of the motion sensor 151 of the terminal device 100 in the first posture on the first axis (that is, the Y axis in the device coordinate system). Further, in S331, whether the first axis of the terminal device 100 is below the horizontal plane (that is, whether the first value a is less than 0) is determined according to the first value a: If it is determined by using the first value a that the first axis of the terminal device 100 is below the horizontal plane, in S332, $\partial_1$ needs to change to $\partial_2$, that is, the angle range of the included angle $\partial_2$ is the third included angle range $-180°\leq\partial_c\leq180°$. Specifically, if the included angle $\partial_1$ calculated by using the quaternion or the rotation matrix belongs to $-90°\leq\partial_{b1}\leq0°$, the processed included angle is $\partial_2=\partial_{b1}-90°$, where $-90°\leq\partial_{b1}\leq0°$. In this way, the angle range of the processed included angle $\partial_2$ is $-180°\leq\partial_{c1}\leq0°$. If the included angle $\partial_1$ calculated by using the quaternion or the rotation matrix belongs to $0°\leq\partial_{b2}\leq90°$, $\partial_2=\partial_{b2}+90°$, where $0°\leq\partial_{b2}\leq90°$. In this way, the angle range of the processed included angle $\partial_2$ is $0°\leq\partial_{c1}\leq180°$.

If it is determined by using the first value a that the first axis of the terminal device 100 is above the horizontal plane, no processing needs to be performed on $\partial_1$, and the subsequent steps may be directly used.

In S340, the processor 180 constructs a new second quaternion $q_0$ for representing rotation according to the first included angle $\partial_1$ or $\partial_2$ determined in S330. The second quaternion $q_0$ represents only an included angle between the first axis of the terminal device 100 and the gravity direction, or the second quaternion $q_0$ represents only an angle obtained after the terminal device 100 rotates about the third axis of the terminal device 100 in a base station posture (that is, the Z axis in the device coordinate system shown in FIG. 2). Rotation angles of the rest two axes of the terminal device 100 are not considered.

In S350, the processor 180 performs inversion on the second quaternion $q_0$ determined in S340, to obtain a third quaternion $q_1$. The angle represented by the third quaternion $q_1$ and the first included angle are equal in amplitude and opposite in directions.

In S360, the processor 180 inputs the third quaternion $q_1$ to application software. Specifically, the third quaternion $q_1$ is applied to a virtual camera.

It should be noted that, if the virtual camera in the terminal device 100 has rotated relative to a preset state, the third quaternion $q_1$ and a quaternion used for representing rotation of the virtual camera need to be multiplied.

In this way, logically, the virtual object is rotated by an angle, so that the movement track of the virtual object on the display plane relative to the real environment when the terminal device 100 is in the first posture does not change, thereby improving user experience.

In addition, if the movement track of the virtual object on the display plane of the processed terminal device 100 does not meet the condition. For example, if the calculation is wrong or the like, the foregoing step may be performed again, until the condition is met. Further, in the current posture, the motion sensor 151 may be closed. When the terminal device 100 is in another posture, the motion sensor 151 is started continuously, and the foregoing step is repeated until the condition is met.

For example, in the existing technology, for a virtual object flying down from the sky, if the terminal device 100 is in the first posture, the movement track of the virtual object on the display plane inclines as the terminal device 100 inclines, and the movement track of the virtual object observed by the user in the real scenario is no longer the movement track flying down from the sky, but shares the same inclination angle as the terminal device 100. In this embodiment of this application, when the terminal device 100 is in the first posture, the movement track of the virtual object on the display plane does not incline relative to the real environment as the terminal device 100 inclines, the movement track of the virtual object observed by the user in the real scenario does not change, and the movement track of the virtual object in the real scenario is still the movement track flying down from the sky.

As an example rather than limiting, in this embodiment of this application, rotation of the terminal device 100 not only can be represented by using a quaternion, but also may be represented by using a rotation matrix. There may be two processing manners for using a rotation matrix for this embodiment of this application. One processing manner is similar to a processing manner for using a quaternion for this embodiment of this application in FIG. 13. This is not described again for brevity. The other processing manner is using a vector to implement this embodiment of this application.

Figure 14:
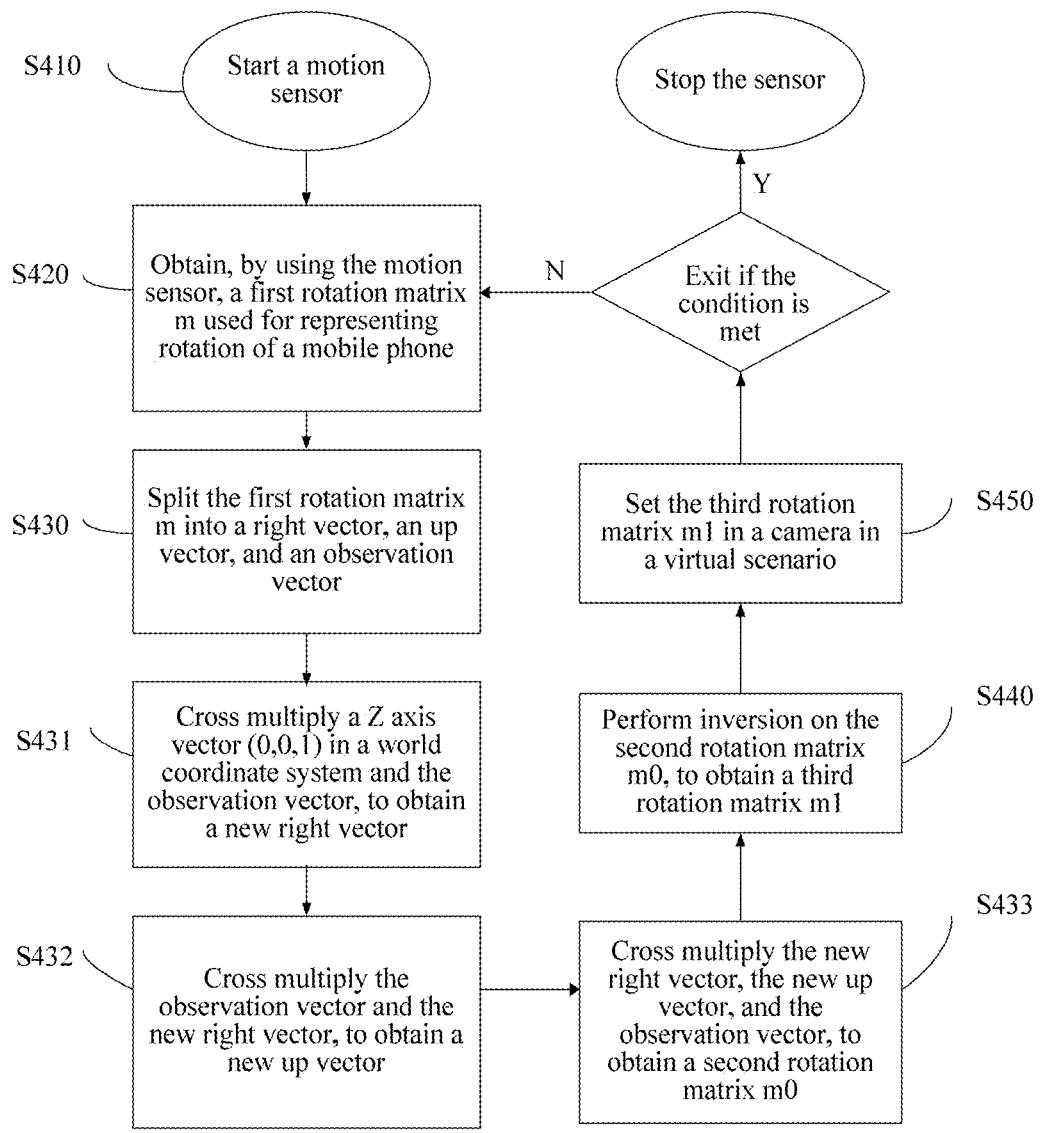
FIG. 14 is a schematic flowchart of another embodiment of this application described by using a rotation matrix used for representing rotation.

The following describes the processing manners by using a rotation matrix and a vector in this embodiment of this application in detail with reference to FIG. 14.

FIG. 14 shows a schematic flowchart of still another embodiment of this application described by using a rotation matrix. As shown in FIG. 14, likewise, an example in which the standard posture of the terminal device 100 is the posture shown in the left diagram in FIG. 7, and the first posture of the terminal device 100 is the posture shown in the right diagram in FIG. 7 (or the posture of the terminal device 100 after the terminal device 100 rotates about the third axis of the device coordinate system (that is, the Z axis in the device coordinate system shown in FIG. 7) from the standard posture by a first included angle) is used to describe the processes of the embodiments of this application in detail.

First, it should be noted that, a right vector described below is a right vector, and may correspond to the X axis in FIG. 2, an up vector is an up vector and may correspond to the Y axis in FIG. 2, and an observation vector is a backward vector and may correspond to the Z axis in FIG. 2. For ease of description, the right vector, the up vector, and the observation vector are uniformly used to describe this embodiment of this application.

Specific steps are as follows:

In S410, a motion sensor 151 is started.

In S420, a first rotation matrix m used for representing rotation is obtained from the motion sensor 151.

In S430, the processor 180 splits the first rotation matrix m into a right vector, an up vector, and an observation vector.

Because a mobile phone needs to rotate about the Z axis, the observation vector is used to perform operations in the following steps:

In S431, a Z axis unit vector (0, 0, 1) in the world coordinate system (that is, a vector that points to the sky and that is perpendicular to the horizontal plane) and the observation vector are cross multiplied, to obtain a new right vector, and normalize the new right vector.

In S432, the observation vector and the new right vector are cross multiplied, to obtain a new up vector.

In S433, the new right vector, the new up vector, and the observation vector construct a new second rotation matrix m0, and the second rotation matrix only includes rotation for the Z axis, that is, indicating a first included angle in the embodiment shown in FIG. 10.

In S440, the processor 180 performs inversion on the second rotation matrix m0, to obtain a third rotation matrix m1.

In S450, the processor 180 inputs the third rotation matrix m1 to application software. Specifically, the third rotation matrix m1 is applied to a virtual camera.

It should be noted that, if the virtual camera in the terminal device 100 has rotated relative to a preset state, the third rotation matrix m1 and a rotation matrix used for representing rotation of the virtual camera need to be multiplied.

In this way, logically, the virtual object is equivalent to be rotated by an angle, so that the movement track of the virtual object on the display plane relative to the real environment when the terminal device 100 is in the first posture does not change, thereby improving user experience.

Therefore, in the image display method provided in this embodiment of this application, in one aspect, according to information about a first posture of a terminal device, a first movement track of a virtual object on a display plane of a display of the terminal device when the terminal device is in the first posture is determined, so that the virtual object can move along the first movement track in the virtual world including the first image shot by using a camera. Therefore, when a posture of the terminal device changes, movement tracks corresponding to the virtual object in different postures may change relative to the terminal device, but not change relative to a real environment. That is, a movement track of a virtual object observed by a user in a real scenario does not change, thereby improving fidelity of the AR technology, and improving user experience.

In another aspect, when the terminal device is in the first posture, the first movement track is determined by using a first included angle between two directions (that is, the first direction and the second direction) only, so that not only the movement track of the virtual object on the display plane cannot change relative to the real environment (or the world coordinate system), but also implementation complexity can be effectively reduced, thereby reducing complexity of a calculation process. Meanwhile, by using the included angle between the two directions, in a moving process of the terminal device, the virtual object can be always presented on the display plane of the terminal device. It is avoided that when the terminal device moves in a larger range, the virtual object is no longer presented on the display plane, thereby further effectively improving user experience.

In still another aspect, the terminal device rotates about a third axis perpendicular to the display plane, which may meet use habits of the user using the terminal device, so that the display plane of the terminal device may face the user (or the display plane of the terminal device is within a view range of the user), to make the image displayed on the display plane and the virtual object be capable of being observed by the user.

The following describes the image display method according to the embodiments of this application in detail with reference to FIG. 1 to FIG. 14. The following describes the image display apparatus and the terminal device according to the embodiments of this application with reference to FIG. 15 and FIG. 16.

Figure 15:
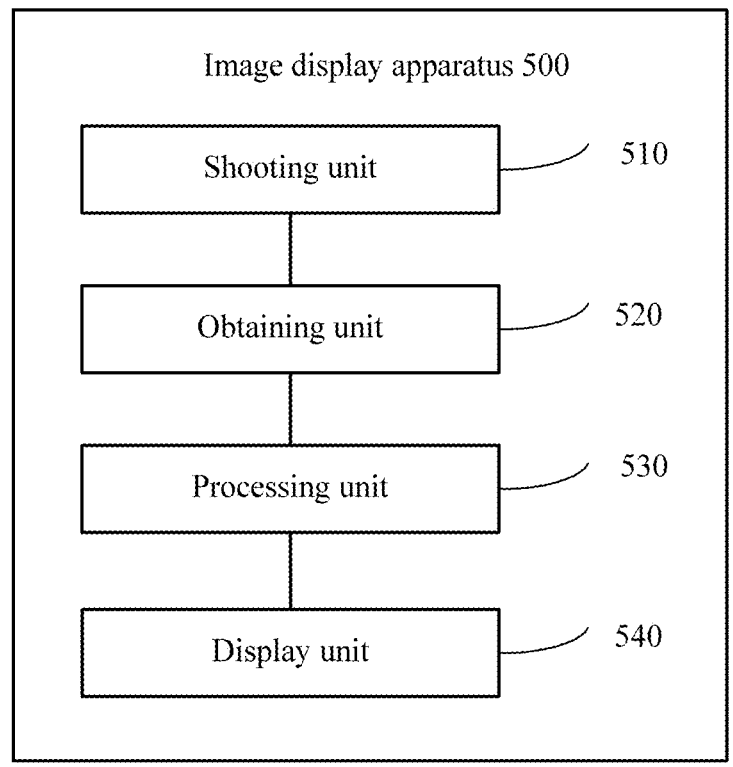
FIG. 15 is a schematic block diagram of an image display apparatus according to an embodiment of this application.

FIG. 15 shows an image display apparatus according to an embodiment of this application. The apparatus 500 includes:

a capturing unit 510, configured to shoot a first image;

an obtaining unit 520, configured to obtain information about a first posture, the first posture being a posture of the terminal device when the terminal device captures the first image;

a processing unit 530, configured to determine a first movement track of the virtual object moving from a first position to a second position in the virtual world according to the information about the first posture; and a display unit 540, configured to present the first image as a background image of the virtual world, and dynamically render the virtual object according to the first movement track, so that the virtual object moves along the first movement track in the virtual world including the first image.

Therefore, the image display apparatus provided in this embodiment of this application determines, according to information about a first posture of a terminal device, a first movement track of a virtual object on a display plane of a display of the terminal device when the terminal device is in the first posture, so that the virtual object can move along the first movement track in the virtual world including the first image shot by using a camera. Therefore, when a posture of the terminal device changes, movement tracks corresponding to the virtual object in different postures may change relative to the terminal device, but not change relative to a real environment. That is, a movement track of a virtual object observed by a user in a real scenario does not change, thereby improving fidelity of the AR technology, and improving user experience.

In some embodiments, the obtaining unit 520 is specifically configured to:

determine a first direction, where the first direction is a direction of a preset first axis in a device coordinate system of the terminal device in the first posture in a world coordinate system;

determine a second direction, where the second direction is a direction of a preset second axis in the world coordinate system; and use information about an included angle between the first direction and the second direction as the information about the first posture.

Therefore, the image display apparatus provided in this embodiment of this application determines, when the terminal device is in the first posture, the first movement track by using a first included angle between two directions (that is, the first direction and the second direction) only, so that not only the movement track of the virtual object on the display plane cannot change relative to the real environment (or the world coordinate system), but also implementation complexity can be effectively reduced, thereby reducing complexity of a calculation process. Meanwhile, by using the included angle between the two directions, in a moving process of the terminal device, the virtual object can be always presented on the display plane of the terminal device. It is avoided that when the terminal device moves in a larger range, the virtual object is no longer presented on the display plane, thereby further effectively improving user experience.

In some embodiments, the second direction is a gravity direction in the world coordinate system.

In some embodiments, the obtaining unit 520 is further configured to:

determine an included angle by which the terminal device rotates in a process of rotating about a preset third axis from a preset standard posture to be in the first posture; and use information about the included angle as the information about the first posture.

In some embodiments, the processing unit 530 is specifically configured to:

determine a preset candidate movement track as the first movement track when the included angle is within the preset first angle range; and determine the first movement track according to the candidate movement track and a difference between the included angle and a first boundary value of the first angle range, when the included angle is outside the preset first angle range.

In some embodiments, the processing unit 530 is specifically configured to:

perform preset conversion processing on the included angle when the included angle is outside a second angle range, so that the included angle on which the conversion processing has been performed is outside the second angle range and within the preset third angle range, where the second angle range is an angle range to which an angle obtained through calculation based on a quaternion or a rotation matrix used for representing rotation belongs; and determine the first movement track according to the included angle on which the conversion processing has been performed.

In some embodiments, the obtaining unit 520 is further configured to:

obtain a standard movement track, where the standard movement track includes a movement track of the virtual object in frames displayed by the terminal device when the terminal device is in a preset standard posture; and the processing unit 530 is specifically configured to:

determine the first movement track according to the information about the first posture and the standard movement track.

In some embodiments, the standard posture includes a posture of the terminal device when the preset first axis in the device coordinate system of the terminal device is parallel or approximately parallel to a horizontal plane, where the first axis is parallel to a width direction or a length direction of the terminal device.

In some embodiments, the processing unit 530 is further configured to:

obtain first user operation information, where the first user operation information is generated according to a selection operation of a user for at least two postures; and determine the standard posture from the at least two postures according to the first user operation information.

In some embodiments, the processing unit 530 is further configured to:

obtain second user operation information, where the second user operation information is used for indicating a first shape; and determine the standard movement track according to the second user operation information, so that the standard movement track corresponds to the first shape.

In some embodiments, the obtaining unit 520 is further configured to:

obtain mapping relationship information, where the mapping relationship information is used for indicating a mapping relationship between identifiers of a plurality of types of postures and a plurality of types of movement tracks; and the processing unit 530 is specifically configured to:

determine, according to an identifier of the first posture, the first movement track corresponding to the identifier of the first posture from the mapping relationship.

In some embodiments, the first axis is parallel to any one of the following directions:

a length direction of the display, or a width direction of the display, or a length direction of the terminal device, or a width direction of the terminal device.

Therefore, the image display apparatus provided in this embodiment of this application, in one aspect, determines, according to information about a first posture of a terminal device, a first movement track of a virtual object on a display plane of a display of the terminal device when the terminal device is in the first posture, so that the virtual object can move along the first movement track in the virtual world including the first image shot by using a camera. Therefore, when a posture of the terminal device changes, movement tracks corresponding to the virtual object in different postures may change relative to the terminal device, but not change relative to a real environment. That is, a movement track of a virtual object observed by a user in a real scenario does not change, thereby improving fidelity of the AR technology, and improving user experience.

In another aspect, when the terminal device is in the first posture, the first movement track is determined by using a first included angle between two directions (that is, the first direction and the second direction) only, so that not only the movement track of the virtual object on the display plane cannot change relative to the real environment (or the world coordinate system), but also implementation complexity can be effectively reduced, thereby reducing complexity of a calculation process. Meanwhile, by using the included angle between the two directions, in a moving process of the terminal device, the virtual object can be always presented on the display plane of the terminal device. It is avoided that when the terminal device moves in a larger range, the virtual object is no longer presented on the display plane, thereby further effectively improving user experience.

In still another aspect, the terminal device rotates about a third axis perpendicular to the display plane, which may meet use habits of the user using the terminal device, so that the display plane of the terminal device may face the user (or the display plane of the terminal device is within a view range of the user), to make the image displayed on the display plane and the virtual object be capable of being observed by the user.

Figure 16:
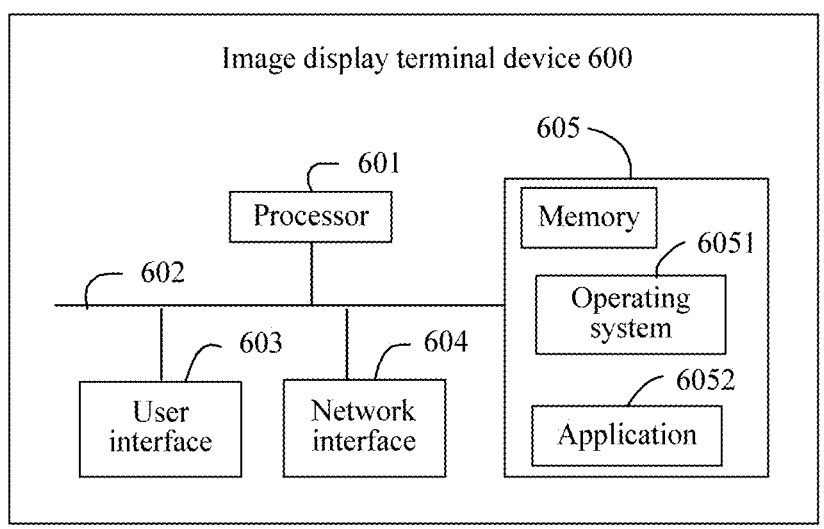
FIG. 16 is a schematic structural diagram of an image display terminal device according to an embodiment of this application.

FIG. 16 is s schematic structural diagram of an image display terminal device according to an embodiment of this application. The image display terminal device 600 includes: at least one processor 601, at least one network interface 604 or another user interface 603, a memory 605, and at least one communications bus 602. The communications bus 602 is configured to implement connection and communication between the components.

In some embodiments, the terminal device 600 includes a user interface 603, a display (for example, a touchpad, an LCD, a CRT, a holographic imaging device, or a projection device), and a keyboard or a click device (for example, a mouse, a trackball, a touch panel, or a touch screen).

The memory 605 may include a read only memory and a random access memory, and provides an instruction and data to the processor 601. A part of the memory 605 may further include a non-volatile random access memory (NVRAM).

In some implementations, the memory 605 stores the following element, executable module, or data structure, or a subset thereof, or an extension set thereof.

An operating system 6051 includes various system programs, for example, a frame layer, a core library layer, and a drive layer shown in FIG. 1, used for implementing various basic services and processing tasks based on hardware.

An application module 6052 includes various applications, for example, a launcher, a media player, and a browser shown in FIG. 1, used for implementing various application services.

In this embodiment of this application, by invoking the program or instruction stored in the memory 605, a camera 6031 is configured to shoot a first image.

The processor 601 obtains information about a first posture, the first posture being a posture of the terminal device when the terminal device captures the first image.

The processor 601 is further configured to determine a first movement track according to the information about the first posture.

The display 6032 presents the first image, and presents a virtual object according to the first movement track, so that the virtual object moves along the first movement track in the virtual world including the first image as the background.

Therefore, the image display terminal device provided in this embodiment of this application, determines, according to information about a first posture of the terminal device, a first movement track of a virtual object on a display plane of a display of the terminal device when the terminal device is in the first posture, so that the virtual object can move along the first movement track in the virtual world including the first image shot by using a camera. Therefore, when a posture of the terminal device changes, movement tracks corresponding to the virtual object in different postures may change relative to the terminal device, but not change relative to a real environment. That is, a movement track of a virtual object observed by a user in a real scenario does not change, thereby improving fidelity of the AR technology, and improving user experience.

In some embodiments, the processor 601 is specifically configured to:

determine a first direction, where the first direction is a direction of a preset first axis in a device coordinate system of the terminal device in the first posture in a world coordinate system;

determine a second direction, where the second direction is a direction of a preset second axis in the world coordinate system; and use information about an included angle between the first direction and the second direction as the information about the first posture.

Therefore, the image display terminal device provided in this embodiment of this application determines, when the terminal device is in the first posture, the first movement track by using a first included angle between two directions (that is, the first direction and the second direction) only, so that not only the movement track of the virtual object on the display plane cannot change relative to the real environment (or the world coordinate system), but also implementation complexity can be effectively reduced, thereby reducing complexity of a calculation process.

Meanwhile, by using the first included angle between the two directions, in a moving process of the terminal device, the virtual object can be always presented on the display plane of the terminal device. It is avoided that when the terminal device moves in a larger range, the virtual object is no longer presented on the display plane, thereby further effectively improving user experience.

In some embodiments, the second direction is a gravity direction in the world coordinate system.

In some embodiments, the processor 601 is further configured to:

determine an included angle by which the terminal device rotates in a process of rotating about a preset third axis from a preset standard posture to be in the first posture; and use information about the included angle as the information about the first posture.

In some embodiments, the processor 601 is specifically configured to:

determine a preset candidate movement track as the first movement track when the included angle is within the preset first angle range; and determine the first movement track according to the candidate movement track and a difference between the included angle and a first boundary value of the first angle range, when the included angle is outside the preset first angle range.

In some embodiments, the processor 601 is specifically configured to:

perform preset conversion processing on the included angle when the included angle is outside a second angle range, so that the included angle on which the conversion processing has been performed is outside the second angle range and within the preset third angle range, where the second angle range is an angle range to which an angle obtained through calculation by using a quaternion or a rotation matrix used for representing rotation belongs; and determine the first movement track according to the included angle on which the conversion processing has been performed.

In some embodiments, the processor 601 is specifically configured to:

obtain a standard movement track, where the standard movement track includes a movement track of the virtual object in frames displayed by the terminal device when the terminal device is in a preset standard posture; and determine the first movement track according to the information about the first posture and the standard movement track.

In some embodiments, the standard posture includes a posture of the terminal device when the preset first axis in the device coordinate system of the terminal device is parallel or approximately parallel to a horizontal plane, where the first axis is parallel to a width direction or a length direction of the terminal device.

In some embodiments, the processor 601 is further configured to:

obtain first user operation information, where the first user operation information is generated according to a selection operation of a user for at least two postures; and determine the standard posture from the at least two postures according to the first user operation information.

In some embodiments, the processor 601 is further configured to:

obtain second user operation information, where the second user operation information is used for indicating a first shape; and determine the standard movement track according to the second user operation information, so that the standard movement track corresponds to the first shape.

In some embodiments, the processor 601 is specifically configured to:

obtain mapping relationship information, where the mapping relationship information is used for indicating a mapping relationship between identifiers a plurality of types of postures and a plurality of types of movement tracks; and determine, according to an identifier of the first posture, the first movement track corresponding to the identifier of the first posture from the mapping relationship.

In some embodiments, the first axis is parallel to any one of the following directions:

a length direction of the display, or
a width direction of the display, or
a length direction of the terminal device, or
a width direction of the terminal device.

Therefore, the image display terminal device provided in this embodiment of this application, in one aspect, determines, according to information about a first posture of the terminal device, a first movement track of a virtual object on a display plane of a display of the terminal device in the first posture of the terminal device, so that the virtual object can move along the first movement track in the virtual world including the first image shot by using a camera. Therefore, when a posture of the terminal device changes, movement tracks corresponding to the virtual object in different postures may change relative to the terminal device, but not change relative to a real environment. That is, a movement track of a virtual object observed by a user in a real scenario does not change, thereby improving fidelity of the AR technology, and improving user experience.

In another aspect, when the terminal device is in the first posture, the first movement track is determined by using a first included angle between two directions (that is, the first direction and the second direction) only, so that not only the movement track of the virtual object on the display plane cannot change relative to the real environment (or the world coordinate system), but also implementation complexity can be effectively reduced, thereby reducing complexity of a calculation process. Meanwhile, by using the included angle between the two directions, in a moving process of the terminal device, the virtual object can be always presented on the display plane of the terminal device. It is avoided that when the terminal device moves in a larger range, the virtual object is no longer presented on the display plane, thereby further effectively improving user experience.

In still another aspect, the terminal device rotates about a third axis perpendicular to the display plane, which may meet use habits of the user using the terminal device, so that the display plane of the terminal device may face the user (or the display plane of the terminal device is within a view range of the user), to make the image displayed on the display plane and the virtual object be capable of being observed by the user.

An embodiment of this application further provides a computer program product. The computer program product includes: computer program code, and the computer program code is used by a terminal device (for example, the foregoing display image apparatus or terminal device, and specifically, the determining unit in the display image apparatus or the processor in the terminal device) to perform steps performed by the terminal device in the method 200 (for example, the terminal device 100).

An embodiment of this application further provides a computer readable program medium. The computer readable program medium stores a program, and the program causes a terminal device (for example, the foregoing display image apparatus or terminal device, and specifically, the determining unit in the display image apparatus or the processor in the terminal device) to perform steps performed by the terminal device in the method 200 (for example, the terminal device 100).

It should be understood that sequence numbers of the foregoing processes do not mean execution sequences. The execution sequences of the processes should be determined according to functions and internal logic of the processes, and should not be construed as any limitation on the implementation processes of the embodiments of this application.

It should be further understood that, the foregoing "parallel" may be understood as "approximately parallel", and the foregoing "perpendicular" may be understood as "approximately perpendicular". That is, for a person skilled in the art, errors of the foregoing "parallel" or "perpendicular" are allowed within an error range (for example, errors caused by factors such as measurement precision of a motion sensor, small changes of postures of users using the terminal device, manufacture precision of the terminal device), and therefore, all fall within the protection scope of the embodiments of this application.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art can use different methods to implement the described functions for each particular application, but it should not be considered that the implementation goes beyond the scope of the embodiments of this application.

It may be clearly understood by a person skilled in the art that for convenience and brevity of description, for a detailed working process of the foregoing system, apparatus, and unit, reference may be made to a corresponding process in the foregoing method embodiments, and details are not described herein again.

In the several embodiments provided in the embodiments of this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit.

If implemented in the form of software functional units and sold or used as an independent product, the functions may also be stored in a computer-readable storage medium.

Based on such an understanding, the technical solutions of this application essentially, or the part contributing to the existing technology, or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The descriptions are only specific implementations of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. An image display method performed at a terminal device having one or more processors and memory storing programs to be executed by the one or more processors, the method comprising:
    capturing, by the terminal device, a first image;
    obtaining, by the terminal device, information about a first posture, the first posture being a posture of the terminal device when the terminal device captures the first image;
    determining, by the terminal device, an animated movement track for a virtual object to move from a first position to a second position in a virtual world according to the information about the first posture, wherein the animated movement track comprises a movement track of the virtual object on a display of the terminal device when the terminal device is in the first posture;
    displaying, by the terminal device on the display of the terminal device, the first image captured by the terminal device as a background image of the virtual world; and
    dynamically rendering the virtual object on the display of the terminal device to move along the animated movement track in the first image, further including:
        detecting a movement of the terminal device from the first posture to a second posture based on one or more types of motion sensors of the terminal device, the motion sensors configured to obtain a parameter relating to a movement state of the terminal device, the movement state comprises one or more of an inclination of the terminal device and a deflection angle;
        capturing, by the terminal device, a second image at the second posture;
        replacing the first image with the second image as a new background of the virtual world; and
        adjusting an orientation of the virtual object in the virtual world in accordance with the movement of the terminal device from the first posture to the second posture, wherein the animated movement track of the virtual object relative to the new background of the virtual world remains the same when the terminal device moves from the first posture to the second posture.

2. The method according to claim 1, wherein the obtaining, by the terminal device, information about a first posture comprises:
    determining, by the terminal device, a first direction, wherein the first direction is a direction of a preset first axis in a device coordinate system of the terminal device in the first posture in a world coordinate system;
    determining, by the terminal device, a second direction, wherein the second direction is a direction of a preset second axis in the world coordinate system; and
    using, by the terminal device, information about an included angle between the first direction and the second direction as the information about the first posture.

3. The method according to claim 2, wherein the second direction is a gravity direction in the world coordinate system.

4. The method according to claim 2, wherein the determining, by the terminal device, a animated movement track according to the information about the first posture comprises:
    determining, by the terminal device, a preset candidate movement track as the animated movement track when the included angle is within the preset first angle range; and
    determining, by the terminal device, the animated movement track according to the candidate movement track and a difference between the included angle and a first boundary value of the first angle range, when the included angle is outside the preset first angle range.

5. The method according to claim 1, wherein the obtaining, by the terminal device, information about a first posture comprises:
    determining, by the terminal device, an included angle by which the terminal device rotates in a process of rotating about a preset third axis from a preset standard posture to be in the first posture; and
    using, by the terminal device, information about the included angle as the information about the first posture.

6. The method according to claim 5, wherein the standard posture comprises a posture of the terminal device when a preset first axis in a device coordinate system of the terminal device is parallel or approximately parallel to a horizontal plane, wherein the first axis is parallel to a width direction or a length direction of the terminal device.

7. The method according to claim 5, further comprising:
    obtaining, by the terminal device, first user operation information, wherein the first user operation information is generated according to a selection operation of a user for at least two postures; and
    determining, by the terminal device, the standard posture from the at least two postures according to the first user operation information.

8. The method according to claim 1, wherein the obtaining, by the terminal device, information about a first posture comprises:
    obtaining an included angle between a preset first axis in a device coordinate system of the terminal device in the first posture and a preset second axis in a world coordinate system, wherein the included angle is within a preset second angle range;
    obtaining orientation information of the first axis in the device coordinate system in the first posture;
    using information about the included angle as the information about the first posture when the orientation information indicates a preset first orientation; and performing preset conversion processing on the included angle when the orientation information indicates a preset second orientation, to obtain a second included angle, so that information about the second included angle is outside a preset second angle range and within a preset third angle range, and using the information about the second included angle as the information about the first posture.

9. The method according to claim 8, wherein the determining, by the terminal device, a animated movement track according to the information about the first posture comprises:

performing, by the terminal device, preset conversion processing on the included angle when a relationship between the first axis of the terminal device and a preset plane meets a preset condition, so that the included angle on which the conversion processing has been performed is outside the second angle range and within the preset third angle range, wherein the second angle range is an angle range to which an angle obtained through calculation by using a quaternion or a rotation matrix used for representing rotation belongs; and determining, by the terminal device, the animated movement track according to the included angle on which the conversion processing has been performed.

10. The method according to claim 1, further comprising:

obtaining, by the terminal device, a standard movement track, wherein the standard movement track comprises a movement track of the virtual object in frames displayed by the terminal device when the terminal device is in a preset standard posture; and the determining, by the terminal device, a animated movement track according to the information about the first posture comprises:

determining, by the terminal device, the animated movement track according to the information about the first posture and the standard movement track.

11. The method according to claim 10, wherein the obtaining a standard movement track comprises:

obtaining, by the terminal device, second user operation information, wherein the second user operation information is used for indicating a first shape; and determining, by the terminal device, the standard movement track according to the second user operation information, so that the standard movement track corresponds to the first shape.

12. The method according to claim 1, further comprising:

obtaining mapping relationship information, wherein the mapping relationship information is used for indicating a mapping relationship between identifiers of a plurality of types of postures and a plurality of types of movement tracks; and the determining a animated movement track according to the information about the first posture comprises:

determining, according to an identifier of the first posture, the animated movement track corresponding to the identifier of the first posture from the mapping relationship.

13. A terminal device comprising one or more processors, memory coupled to the one or more processors and a plurality of programs stored in the memory that, when executed by the one or more processors, cause the terminal device to perform a plurality of operations comprising:

capturing, by the terminal device, a first image;

obtaining, by the terminal device, information about a first posture, the first posture being a posture of the terminal device when the terminal device captures the first image;

determining, by the terminal device, an animated movement track for a virtual object to move from a first position to a second position in a virtual world according to the information about the first posture, wherein the animated movement track comprises a movement track of the virtual object on a display of the terminal device when the terminal device is in the first posture;

displaying, by the terminal device on the display of the terminal device, the first image captured by the terminal device as a background image of the virtual world; and dynamically rendering the virtual object on the display of the terminal device to move along the animated movement track in the first image, further including:

detecting a movement of the terminal device from the first posture to a second posture based on one or more types of motion sensors of the terminal device, the motion sensors configured to obtain a parameter relating to a movement state of the terminal device, the movement state comprises one or more of an inclination of the terminal device and a deflection angle;

capturing, by the terminal device, a second image at the second posture;

replacing the first image with the second image as a new background of the virtual world; and adjusting an orientation of the virtual object in the virtual world in accordance with the movement of the terminal device from the first posture to the second posture, wherein the animated movement track of the virtual object relative to the new background of the virtual world remains the same when the terminal device moves from the first posture to the second posture.

14. The terminal device according to claim 13, wherein the obtaining, by the terminal device, information about a first posture comprises:

determining, by the terminal device, a first direction, wherein the first direction is a direction of a preset first axis in a device coordinate system of the terminal device in the first posture in a world coordinate system;

determining, by the terminal device, a second direction, wherein the second direction is a direction of a preset second axis in the world coordinate system; and using, by the terminal device, information about an included angle between the first direction and the second direction as the information about the first posture.

15. The terminal device according to claim 13, wherein the obtaining, by the terminal device, information about a first posture comprises:

determining, by the terminal device, an included angle by which the terminal device rotates in a process of rotating about a preset third axis from a preset standard posture to be in the first posture; and using, by the terminal device, information about the included angle as the information about the first posture.

16. The terminal device according to claim 13, wherein the obtaining, by the terminal device, information about a first posture comprises:

obtaining an included angle between a preset first axis in a device coordinate system of the terminal device in the first posture and a preset second axis in a world coordinate system, wherein the included angle is within a preset second angle range;

obtaining orientation information of the first axis in the device coordinate system in the first posture;

using information about the included angle as the information about the first posture when the orientation information indicates a preset first orientation; and performing preset conversion processing on the included angle when the orientation information indicates a preset second orientation, to obtain a second included angle, so that information about the second included angle is outside a preset second angle range and within a preset third angle range, and using the information about the second included angle as the information about the first posture.

17. The terminal device according to claim 13, wherein the plurality of operations further comprise:

obtaining, by the terminal device, a standard movement track, wherein the standard movement track comprises a movement track of the virtual object in frames displayed by the terminal device when the terminal device is in a preset standard posture; and the determining, by the terminal device, a animated movement track according to the information about the first posture comprises:

determining, by the terminal device, the animated movement track according to the information about the first posture and the standard movement track.

18. The terminal device according to claim 13, wherein the plurality of operations further comprise:

obtaining mapping relationship information, wherein the mapping relationship information is used for indicating a mapping relationship between identifiers of a plurality of types of postures and a plurality of types of movement tracks; and the determining a animated movement track according to the information about the first posture comprises:

determining, according to an identifier of the first posture, the animated movement track corresponding to the identifier of the first posture from the mapping relationship.

19. A non-transitory computer readable storage medium storing a plurality of machine readable instructions in connection with a terminal device having one or more processors, wherein the plurality of machine readable instructions, when executed by the one or more processors, cause the terminal device to perform a plurality of operations including:

capturing, by the terminal device, a first image;

obtaining, by the terminal device, information about a first posture, the first posture being a posture of the terminal device when the terminal device captures the first image;

determining, by the terminal device, an animated movement track for a virtual object to move from a first position to a second position in a virtual world according to the information about the first posture, wherein the animated movement track comprises a movement track of the virtual object on a display of the terminal device when the terminal device is in the first posture;

displaying, by the terminal device on the display of the terminal device, the first image captured by the terminal device as a background image of the virtual world; and dynamically rendering the virtual object on the display of the terminal device to move along the animated movement track in the first image, further including:

detecting a movement of the terminal device from the first posture to a second posture based on one or more types of motion sensors of the terminal device, the motion sensors configured to obtain a parameter relating to a movement state of the terminal device, the movement state comprises one or more of an inclination of the terminal device and a deflection angle;

capturing, by the terminal device, a second image at the second posture;

replacing the first image with the second image as a new background of the virtual world; and adjusting an orientation of the virtual object in the virtual world in accordance with the movement of the terminal device from the first posture to the second posture, wherein the animated movement track of the virtual object relative to the new background of the virtual world remains the same when the terminal device moves from the first posture to the second posture.

20. The non-transitory computer readable storage medium according to claim 19, wherein the obtaining, by the terminal device, information about a first posture comprises:

determining, by the terminal device, a first direction, wherein the first direction is a direction of a preset first axis in a device coordinate system of the terminal device in the first posture in a world coordinate system;

determining, by the terminal device, a second direction, wherein the second direction is a direction of a preset second axis in the world coordinate system; and using, by the terminal device, information about an included angle between the first direction and the second direction as the information about the first posture.

* * * * *